(12) United States Patent
Bonk et al.

(10) Patent No.: US 9,713,967 B2
(45) Date of Patent: Jul. 25, 2017

(54) VEHICLE SEAT

(71) Applicant: Faurecia Automotive Seating, LLC, Auburn Hills, MI (US)

(72) Inventors: Jeffery T Bonk, Chesterfield, MI (US); Dale J Frye, West Olive, MI (US); Timothy L Moulton, Newport, RI (US); Jared A Judson, Medford, MA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/081,376

(22) Filed: Mar. 25, 2016

(65) Prior Publication Data

US 2016/0280096 A1 Sep. 29, 2016

Related U.S. Application Data

(60) Provisional application No. 62/138,546, filed on Mar. 26, 2015.

(51) Int. Cl.
*B60N 2/08* (2006.01)
*B60N 2/02* (2006.01)
*B60N 2/20* (2006.01)

(52) U.S. Cl.
CPC ......... *B60N 2/0244* (2013.01); *B60N 2/0228* (2013.01); *B60N 2/0232* (2013.01); *B60N 2/0881* (2013.01); *B60N 2/206* (2013.01); *B60N 2002/0268* (2013.01)

(58) Field of Classification Search
CPC .................. B60N 2/0244; B60N 2/206; B60N 2002/0268; B60N 2/0228; B60N 2/0232; B60N 2/0881
See application file for complete search history.

(56) References Cited

U.S. PATENT DOCUMENTS

| | | | |
|---|---|---|---|
| 6,113,051 A | 9/2000 | Moradell et al. | |
| 6,505,805 B2 | 1/2003 | Fuller | |
| 7,667,345 B2 | 2/2010 | Budweg et al. | |
| 2007/0235297 A1* | 10/2007 | Stoschek | B60N 2/0228 200/5 R |
| 2011/0169294 A1* | 7/2011 | Sandmann | B60N 2/123 296/65.15 |
| 2013/0200668 A1* | 8/2013 | Michalak | B60N 2/0232 297/217.1 |

* cited by examiner

*Primary Examiner* — Yuen Wong
(74) *Attorney, Agent, or Firm* — Barnes & Thornburg LLP

(57) ABSTRACT

A vehicle seat includes a seat bottom and a seat back coupled to the seat bottom to extend upwardly away from the seat bottom and move relative to the seat bottom. The vehicle seat is coupled to a vehicle floor for movement relative to the vehicle floor between a use arrangement and a storage arrangement.

9 Claims, 19 Drawing Sheets

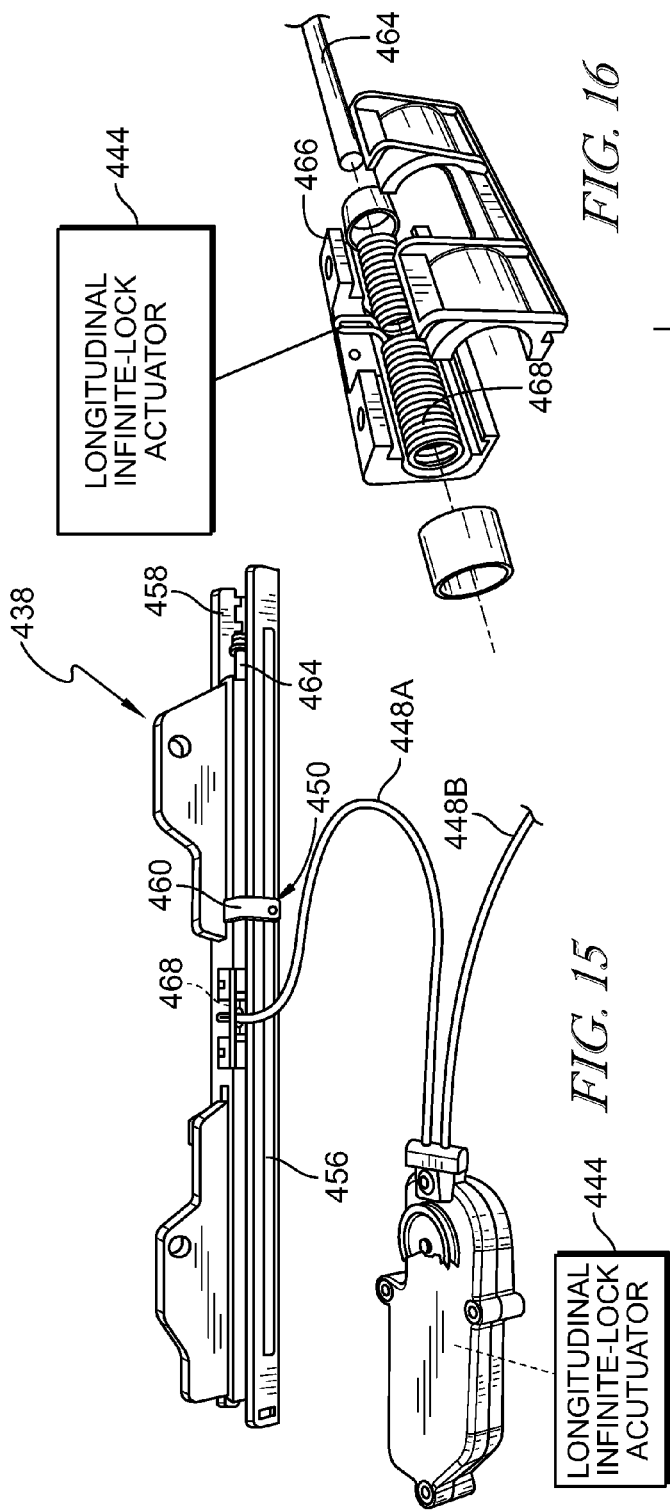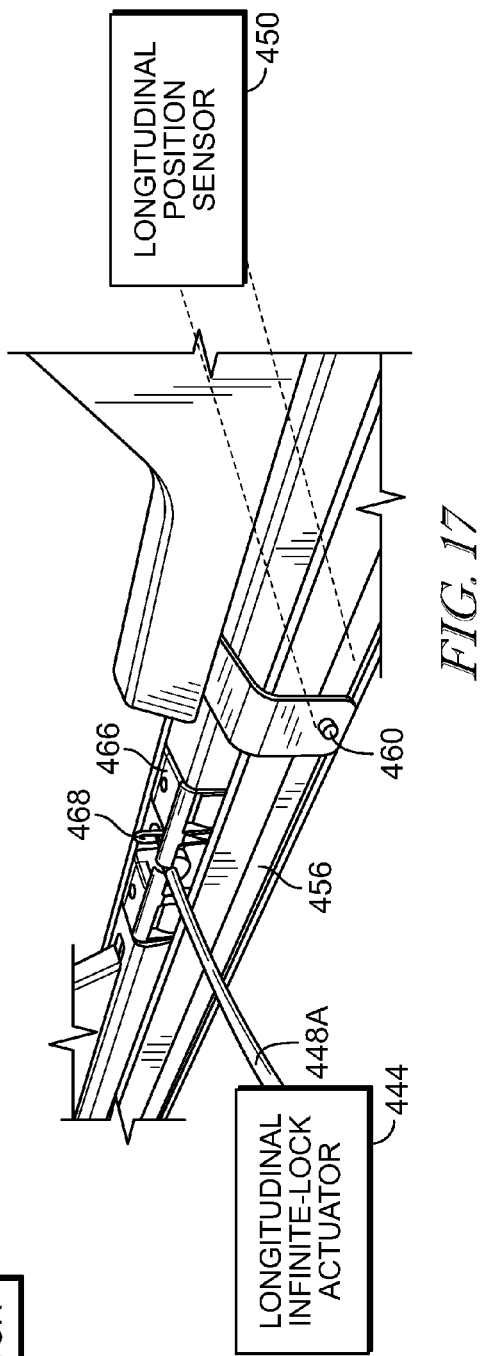

VEHICLE SEAT

PRIORITY CLAIM

This application claims priority under 35 U.S.C. §119(e) to U.S. Provisional Application Ser. No. 62/138,546, filed Mar. 26, 2015, which is expressly incorporated by reference herein.

BACKGROUND

The present disclosure relates to vehicle seats, and particularly to vehicle seats moveable within a passenger vehicle. More particularly, the present disclosure relates to vehicles seats that move to desired positions and orientations in response to user inputs.

SUMMARY

According to the present disclosure, a vehicle seat includes a seat bottom and a seat back coupled to the seat bottom to extend upwardly away from the seat bottom and move relative to the seat bottom. The vehicle seat is coupled to a floor of a vehicle for movement relative to the floor.

In illustrative embodiments, a vehicle-seat motion system includes the vehicle seat, a sensor unit coupled to the vehicle seat to sense an arrangement of the vehicle seat and forces applied to the vehicle seat, an actuation unit coupled to the vehicle seat to allow selective movement of the vehicle seat relative to the floor, and a controller coupled to the sensor unit and the actuation unit and configured to activate the actuation unit in response to a sensed force applied to the seat back to cause the vehicle seat to move to a predetermined storage arrangement and deactivate the actuation in response to sensing the vehicle seat in the predetermined storage arrangement so cargo storage in the vehicle is maximized while user effort and time is minimized.

In illustrative embodiments, the vehicle-seat motion system enables a user to move seats out of the way using a force, taps, or a predetermined pattern of forces (gestures) applied during loading of cargo into the vehicle. Cargo storage is maximized when cargo is loaded into the vehicle when using the vehicle-seat motion system without having to access the vehicle seats from side doors.

In illustrative embodiments, the vehicle seat is in the predetermined storage arrangement when the vehicle seat has slid in a forward direction away from the trunk or rear hatch toward the vehicle seat. The seat back of the vehicle seat may also be pivoted forward toward the front seat so as to establish a generally horizontal cargo-support surface using the rear surface of the seat back. In illustrative embodiments, the vehicle seat may also be raised or lowered to maximize cargo space.

In illustrative embodiments, the vehicle-seat motion system further includes a slide motor and a recline motor both coupled to the actuation unit. The slide motor is coupled to the vehicle seat to cause the vehicle seat to slide relative to the floor in response to force applied to the vehicle seat by the slide motor. The recline motor is coupled to the seat back to cause the seat back to pivot relative to the seat bottom in response to force applied to the seat back by the recline motor.

In illustrative embodiments, the vehicle-seat motion system further includes a manual movement system. The manual movement system is configured to provide means for moving the vehicle seat and the seat back relative to the floor without the use of powered motors applying forces to the vehicle seat to cause the vehicle seat to move in response to the applied forces. The manual movement system causes the vehicle seat and seat back to move in response to application of user-applied forces that are applied directly by the user or through cargo.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of a second-row vehicle seat showing that the seat bottom may be coupled to a track mounted to a floor of a vehicle to slide on the track relative to the floor and showing that the seat motion system may include a slide motor configured to move the seat bottom along the track, a sensor unit configured to detect forces applied to front and back sides of the seat back, an optional height motor mounted to raise and lower the seat relative to the floor, a recline motor mounted to pivot the seat back relative to the seat bottom, a sensor unit configured to detect forces applied to front and back sides of the seat back, and a controller coupled to each of the other components of the seat motion system;

FIGS. 2, 3, and 4 are a series of rear perspective views of another second-row vehicle seat mounted in the passenger vehicle of FIG. 1 showing that the second-row vehicle seat may be moved forward along the floor toward the first-row vehicle seats in response to a package applying a force onto the back side of the seat back included in the second-row vehicle seat during loading of the package so that the second-row vehicle seat may be rearranged within the passenger vehicle to enable the package to be inserted into the passenger vehicle and showing that the seat back of the second-row vehicle seat may be pivoted down toward the seat bottom in response to further force applied by the package onto the back side of the seat back included in the second-row vehicle seat during loading of the package so that the second-row vehicle seat may be rearranged within the passenger vehicle to enable the package to be stowed on top of the second-row vehicle seat;

FIG. 2 is a rear perspective view of another passenger vehicle suggesting that the seat motion system of this passenger vehicle may be configured to slide a second-row vehicle seat forward along the floor in response to a package applying a force onto the back side of the seat back included in the second-row vehicle seat during loading of the package so that the second-row vehicle seat may be rearranged within the passenger vehicle to enable the package to be inserted into the passenger vehicle as shown in FIG. 3;

FIG. 3 is a view similar to FIG. 2 showing the second-row vehicle seat moved forward along the floor toward the first-row vehicle seats after the package has applied a force onto the back side of the seat back included in the second-row vehicle seat during loading of the package so that the second-row vehicle seat may be rearranged within the passenger vehicle to enable the package to be inserted into the passenger vehicle and suggesting that the seat motion system may be configured to pivot the seat back of the second-row vehicle seat down toward the seat bottom in response to further force applied by the package onto the back side of the seat back as shown in FIG. 4;

Figure 1:
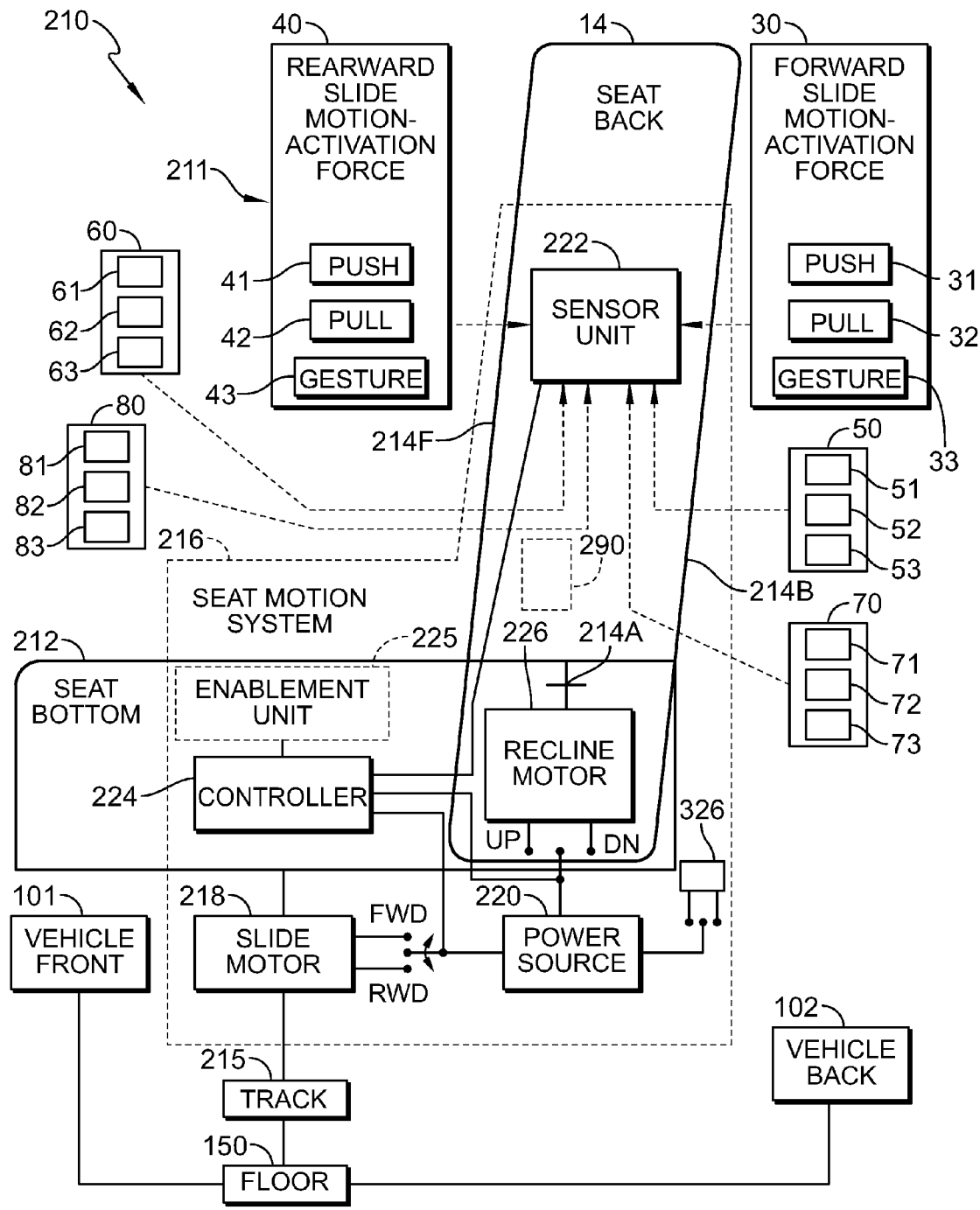
Figure 4:
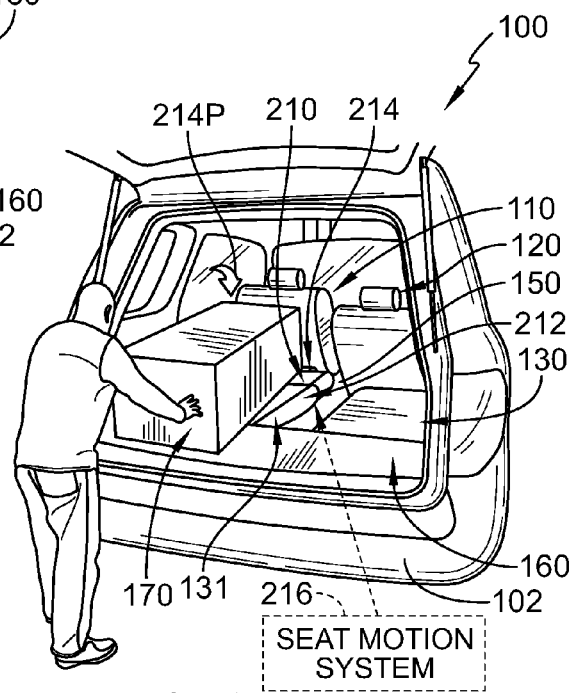
FIG. 4 is a view similar to FIGS. 2 and 3 showing the seat back of the second-row vehicle seat may be pivoted down toward the seat bottom during loading of the package so that the second-row vehicle seat may be rearranged within the passenger vehicle to enable the package to be stowed on top of the second-row vehicle seat.
Figure 6:
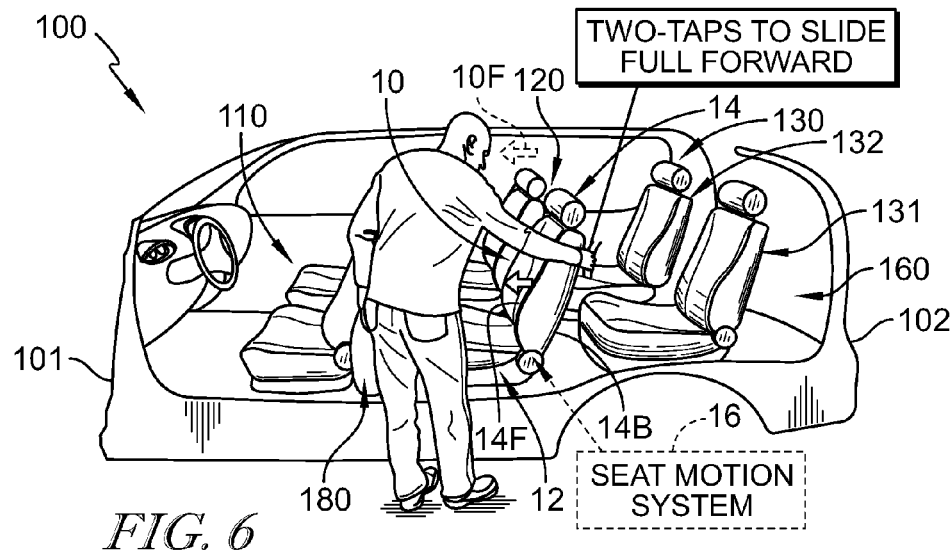
Figure 7:
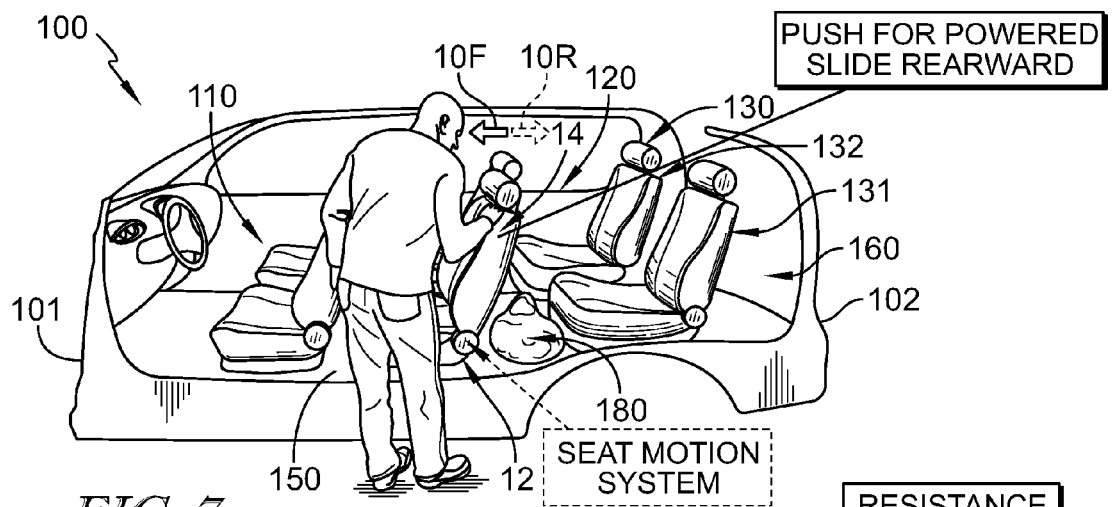
Figure 8:
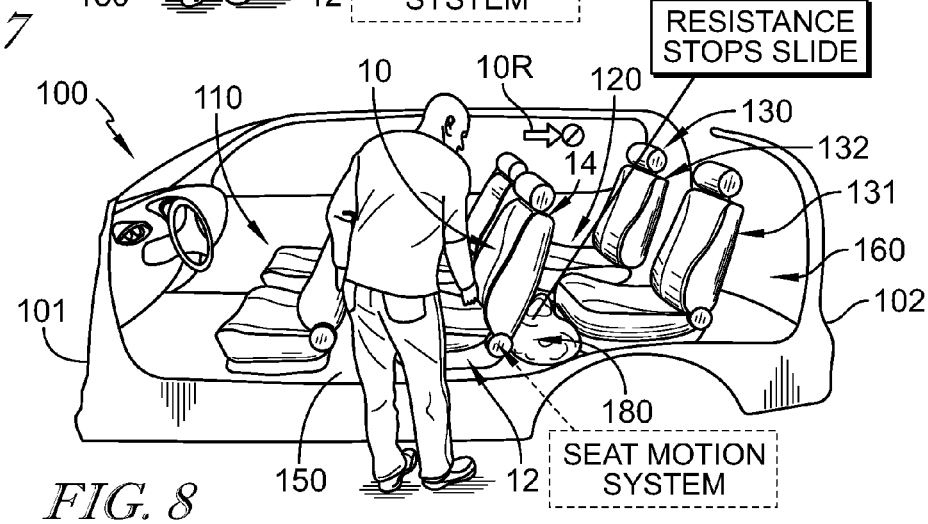
Figure 9A:
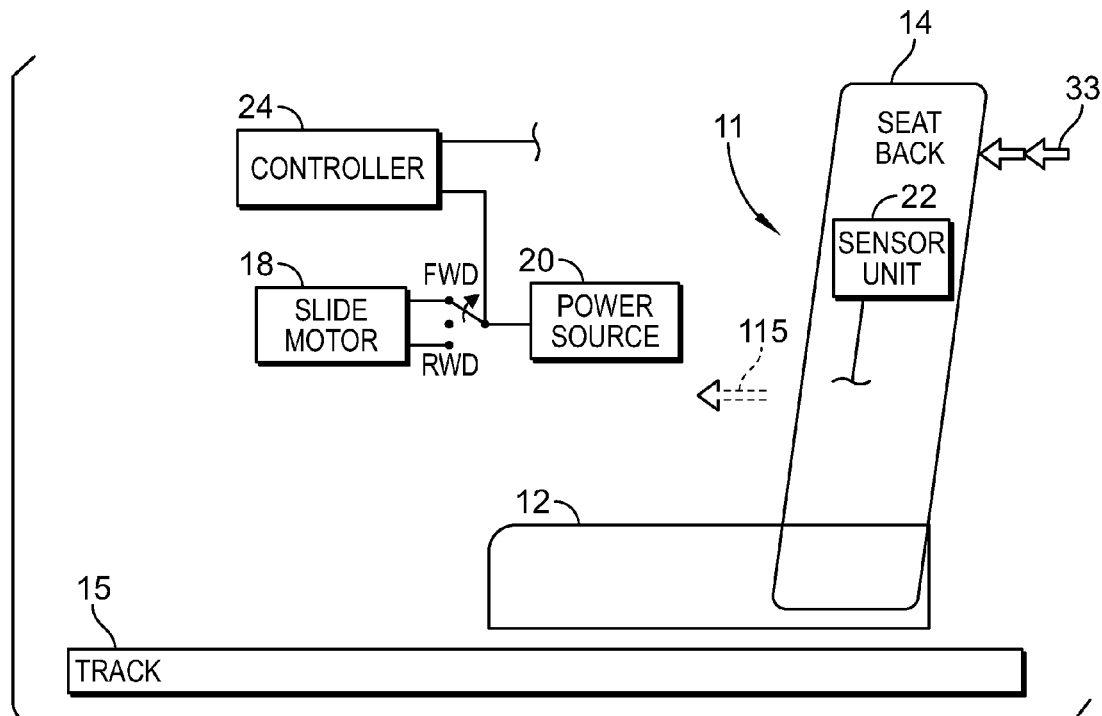
Figure 9B:
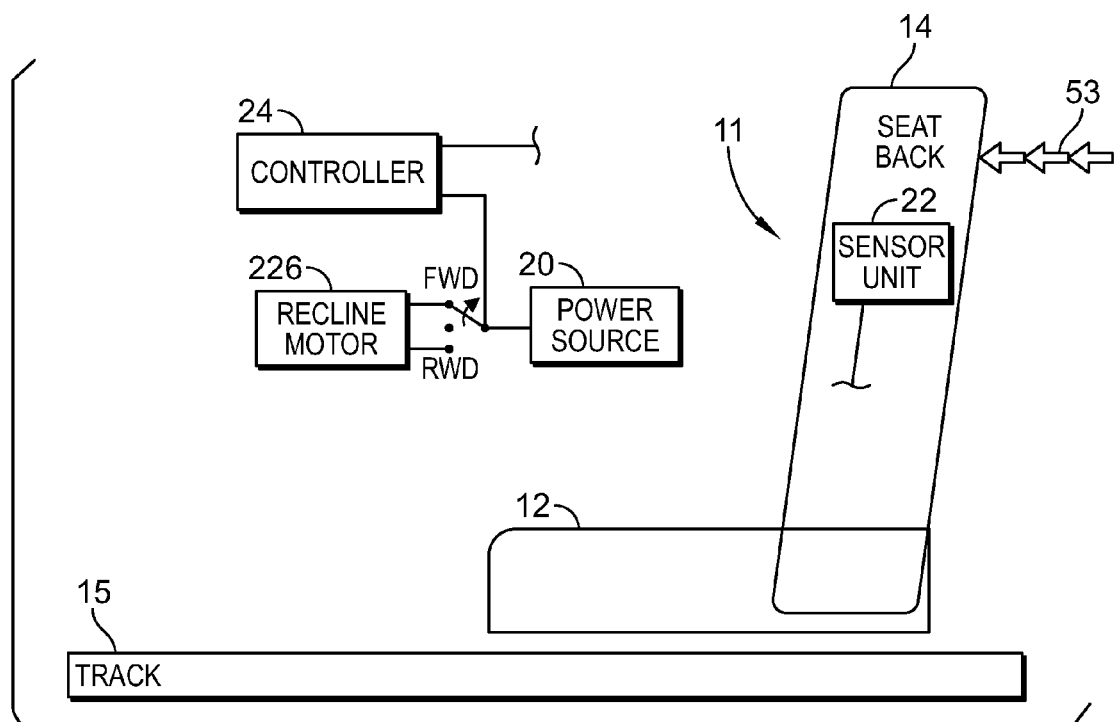
Figure 9C:
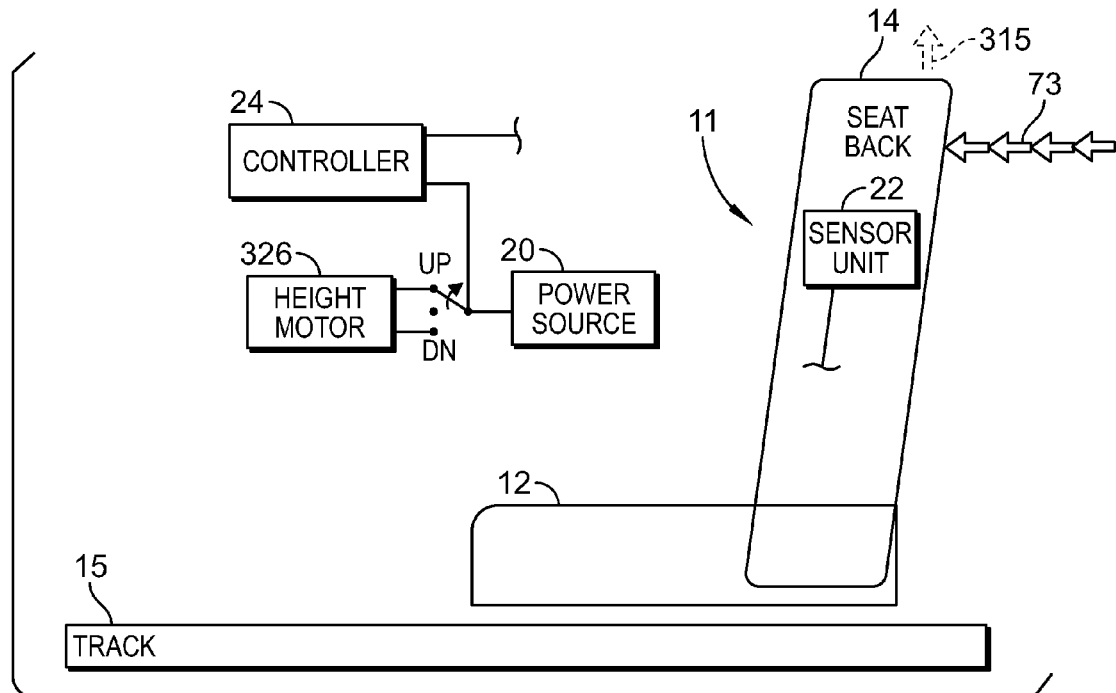
Figure 10A:
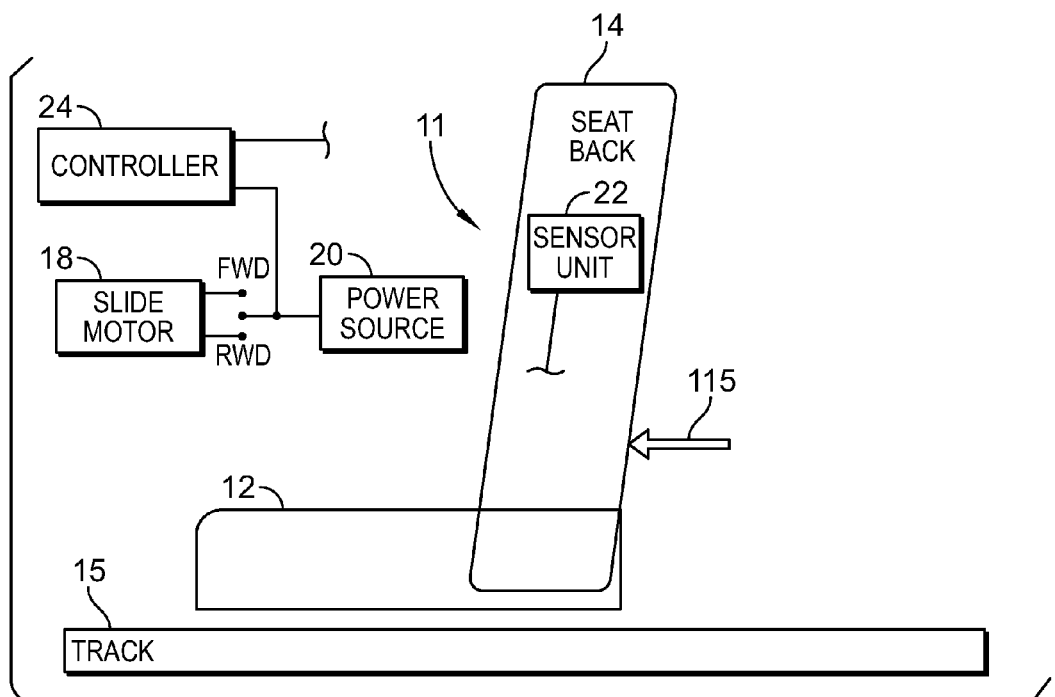
Figure 10B:
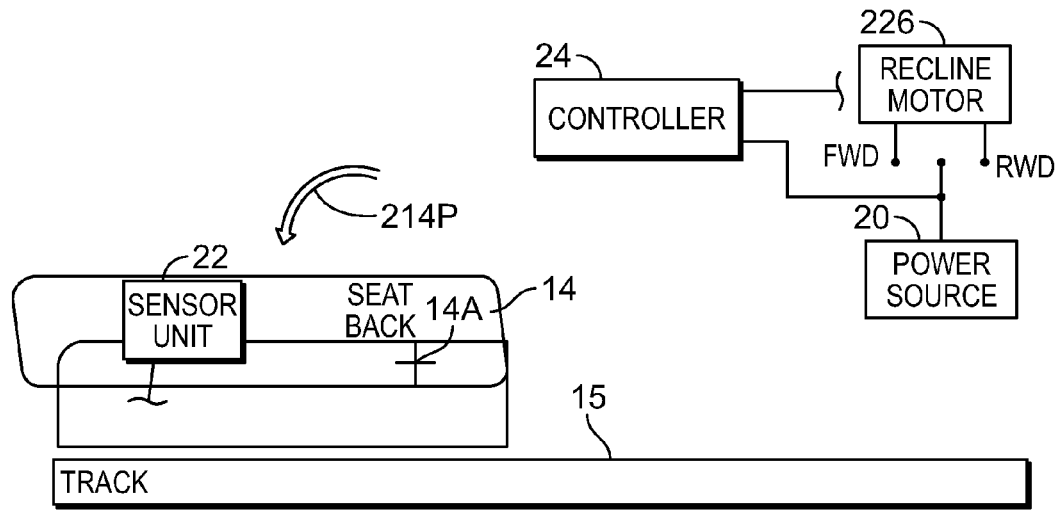
Figure 10C:
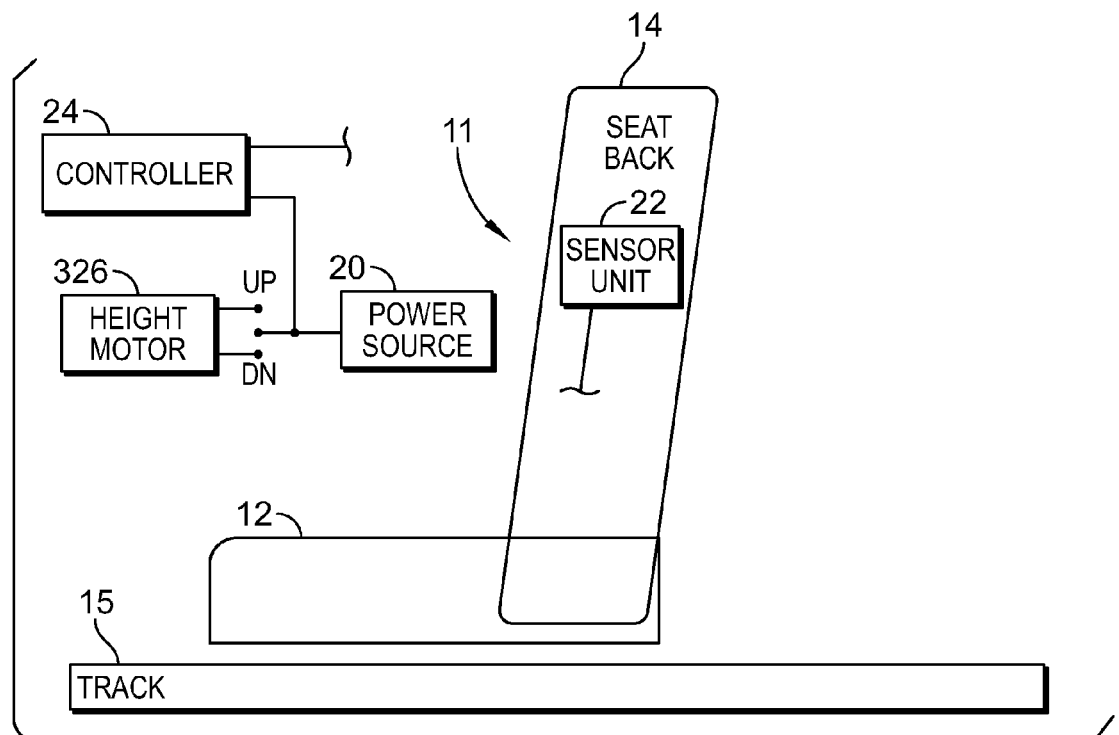
Figure 11A:
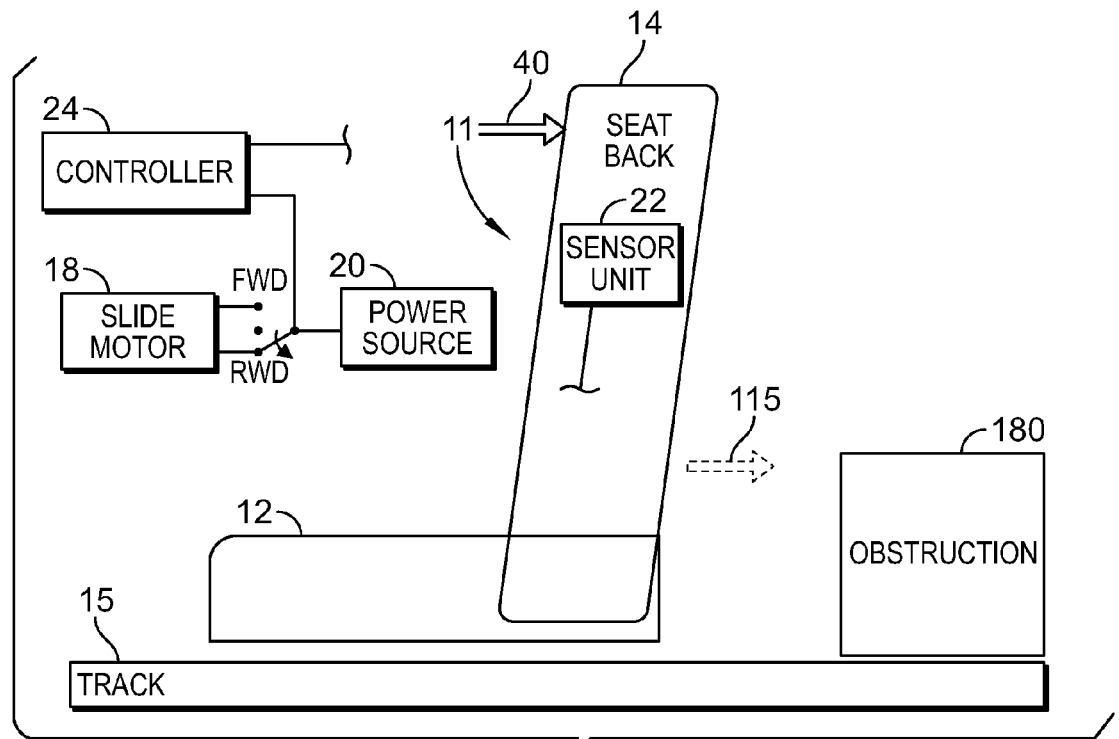
Figure 11B:
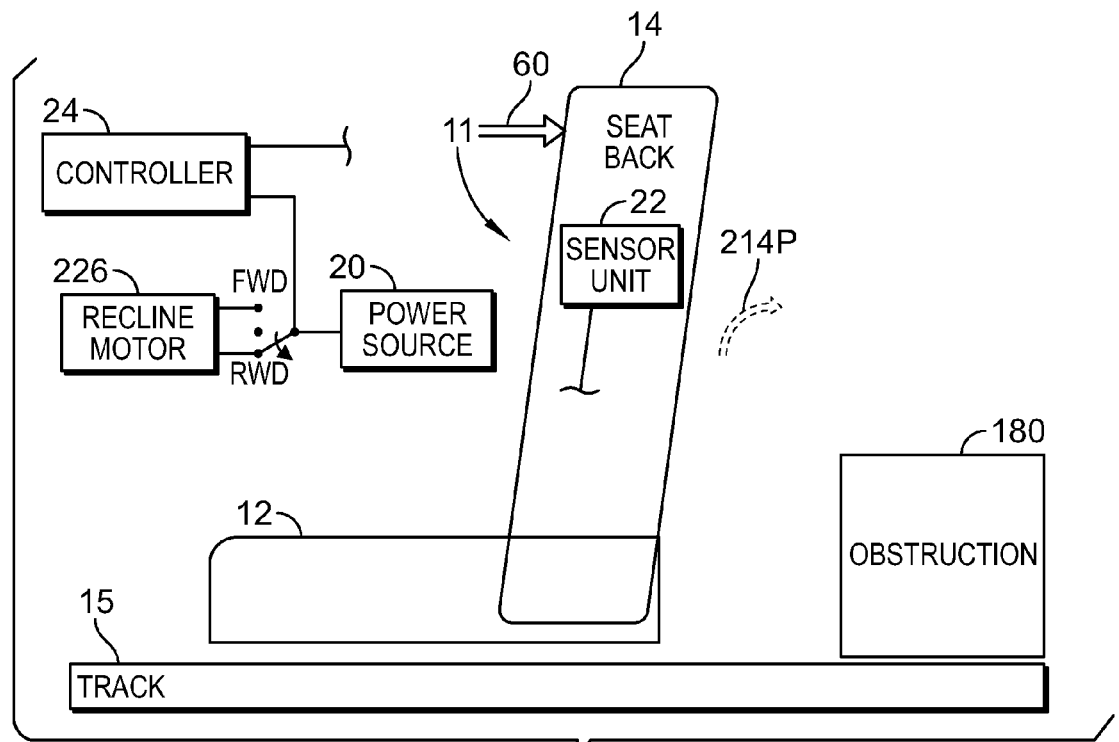
Figure 11C:
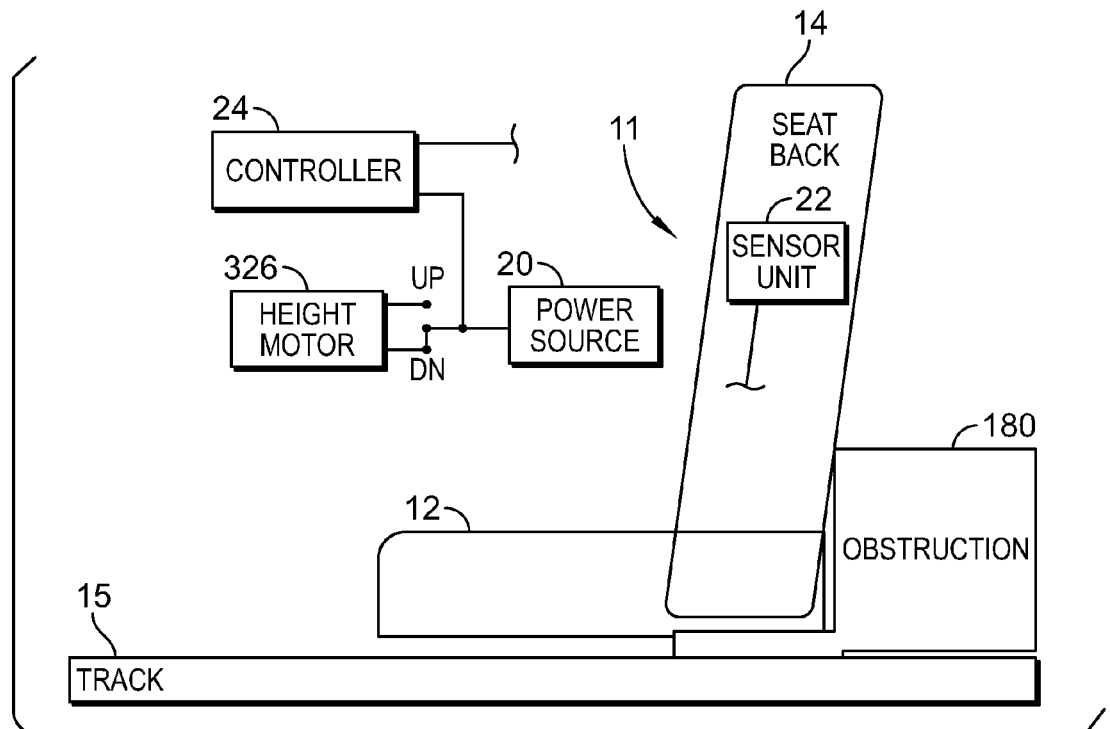
Figure 12A:
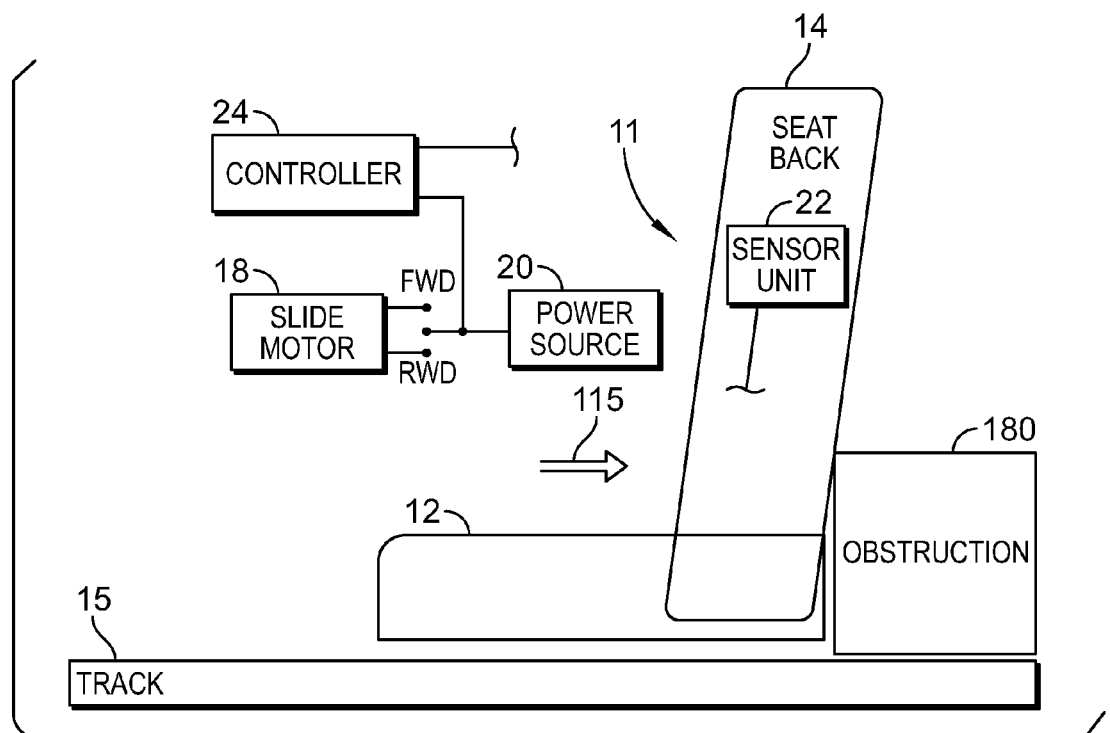
Figure 12B:
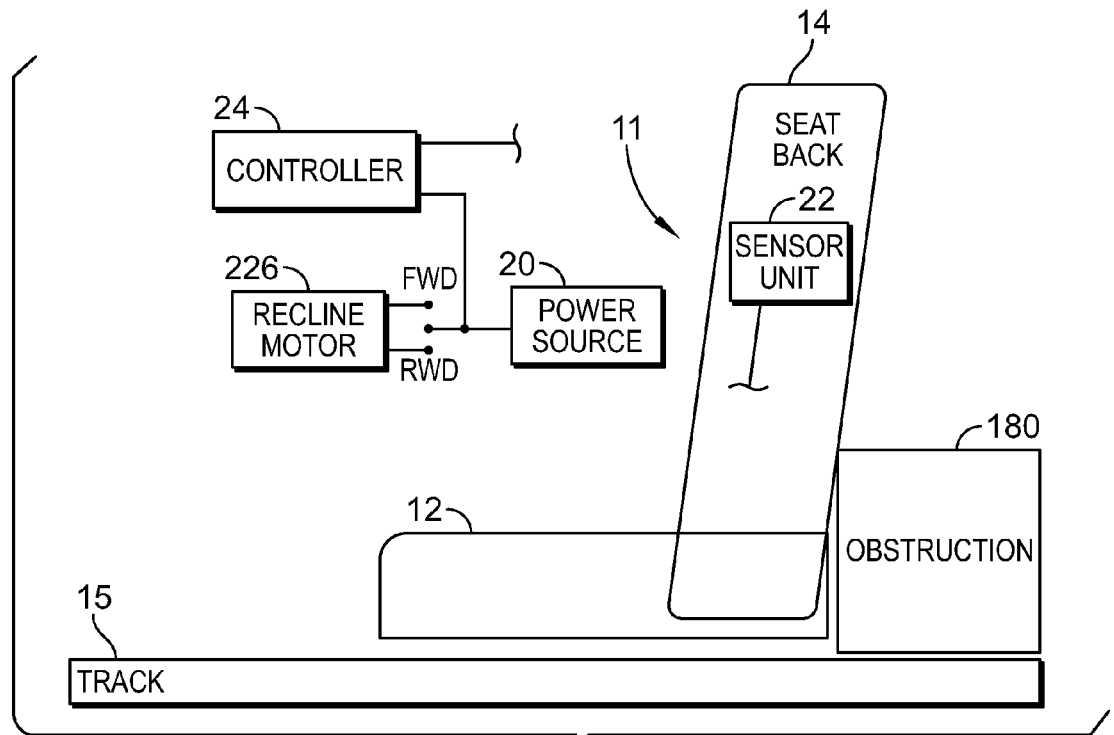
Figure 12C:
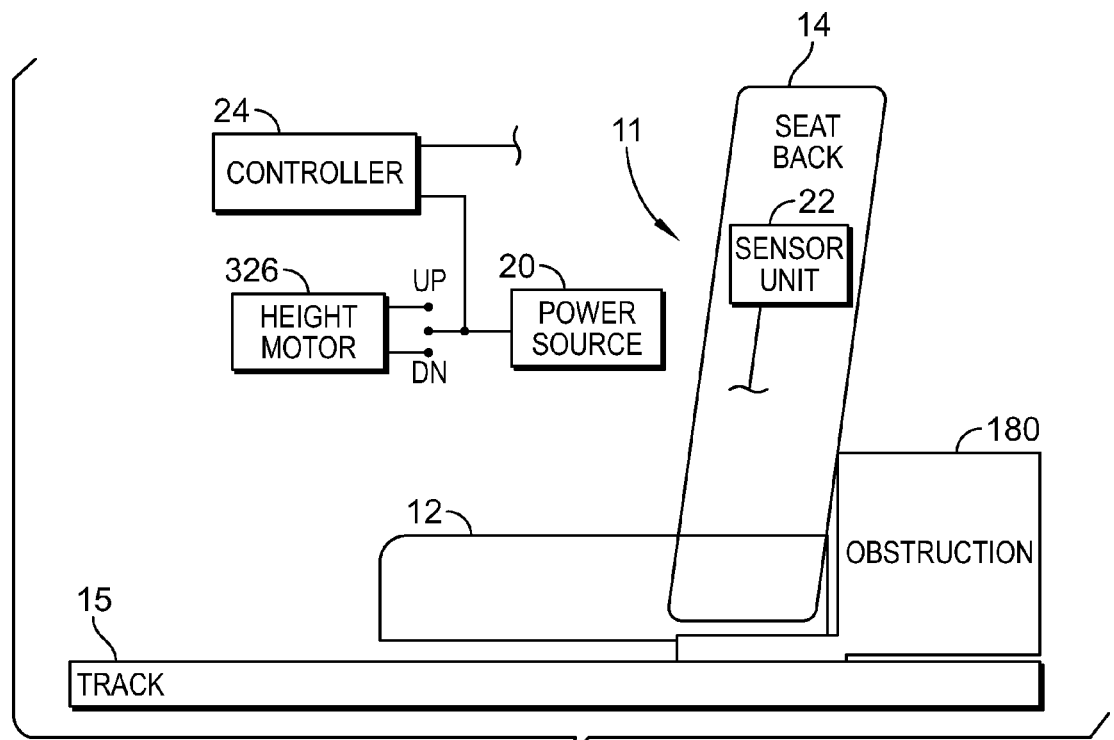
Figure 13:
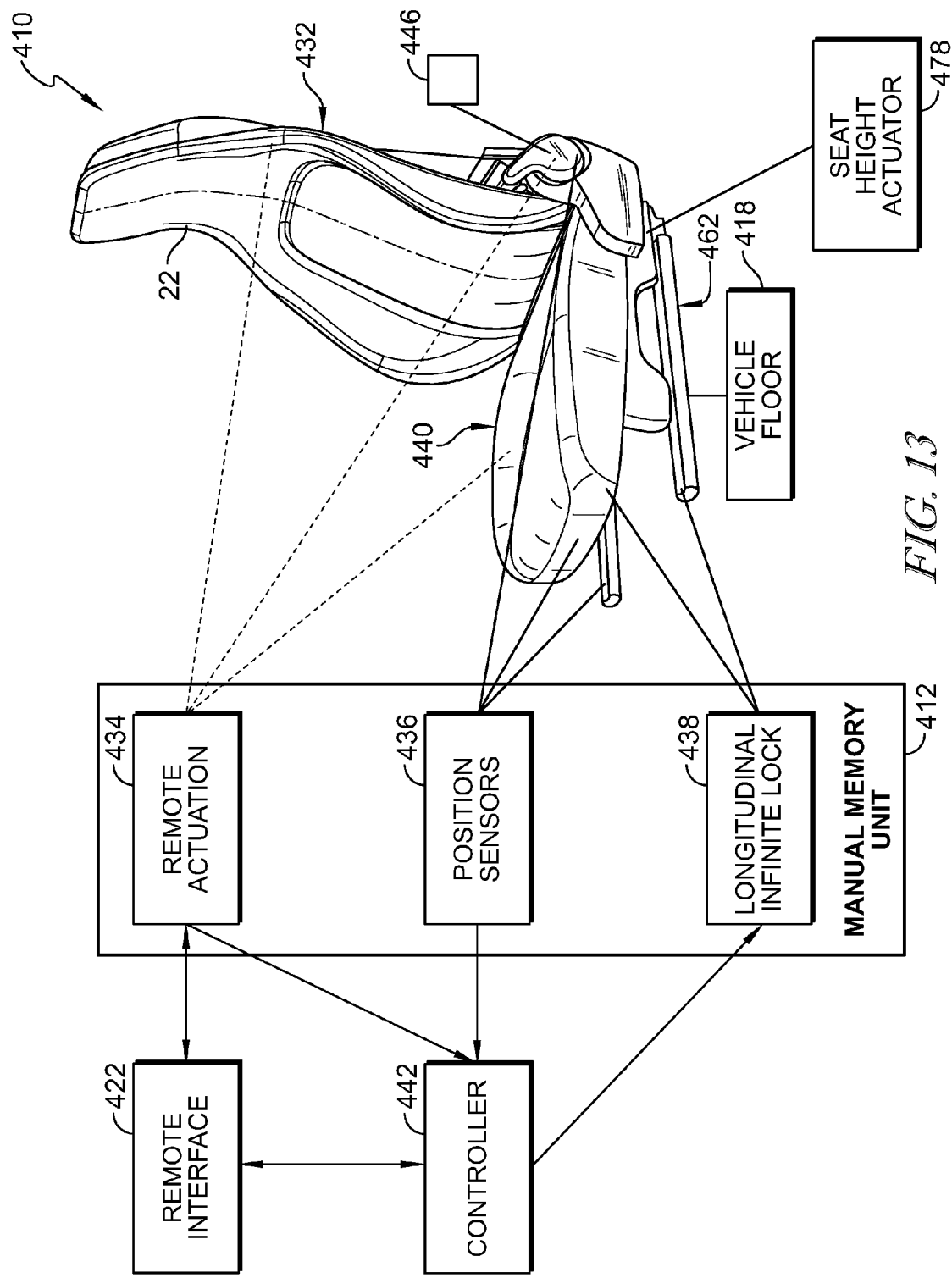
Figure 14:
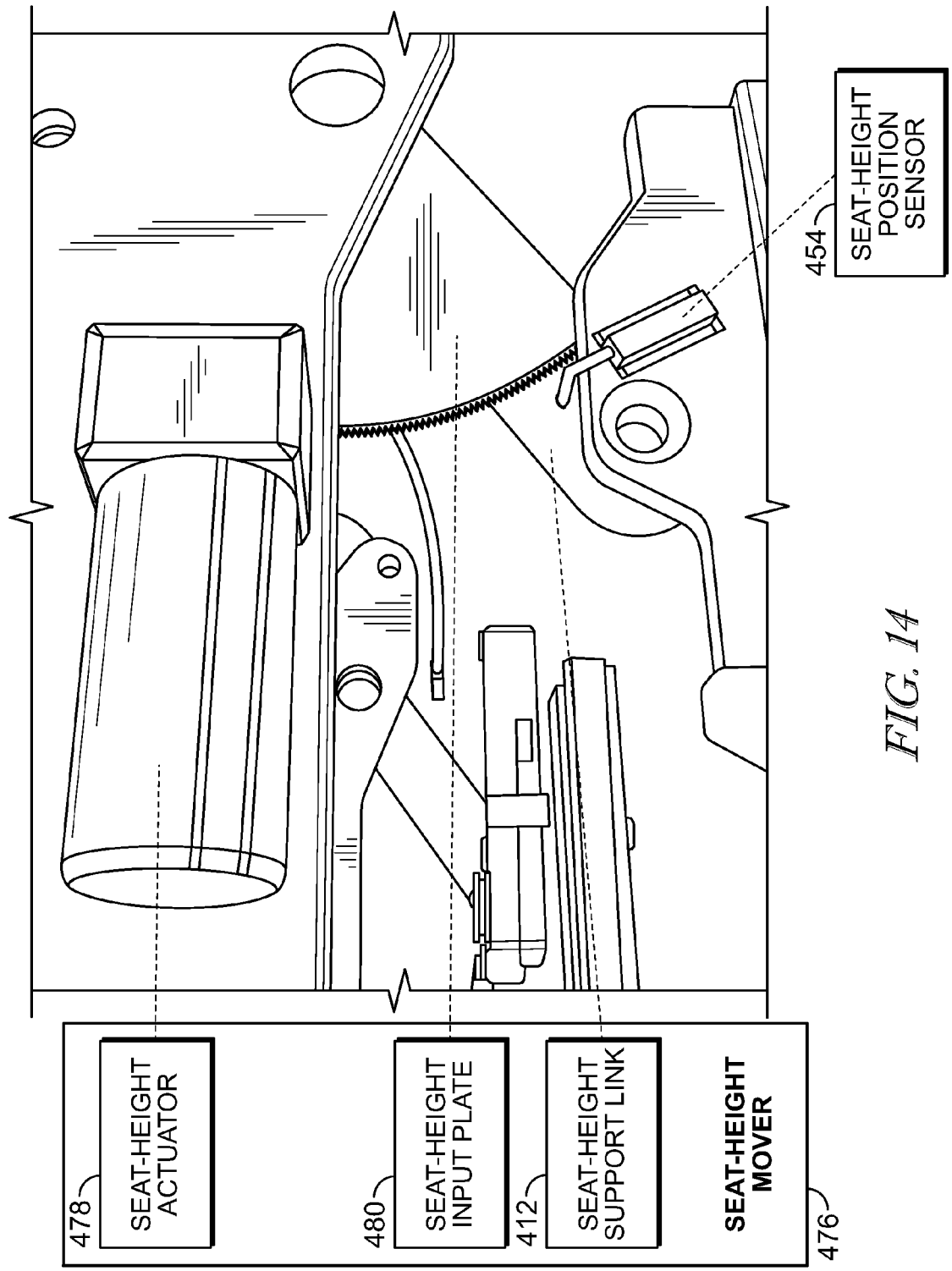
Figure 18:
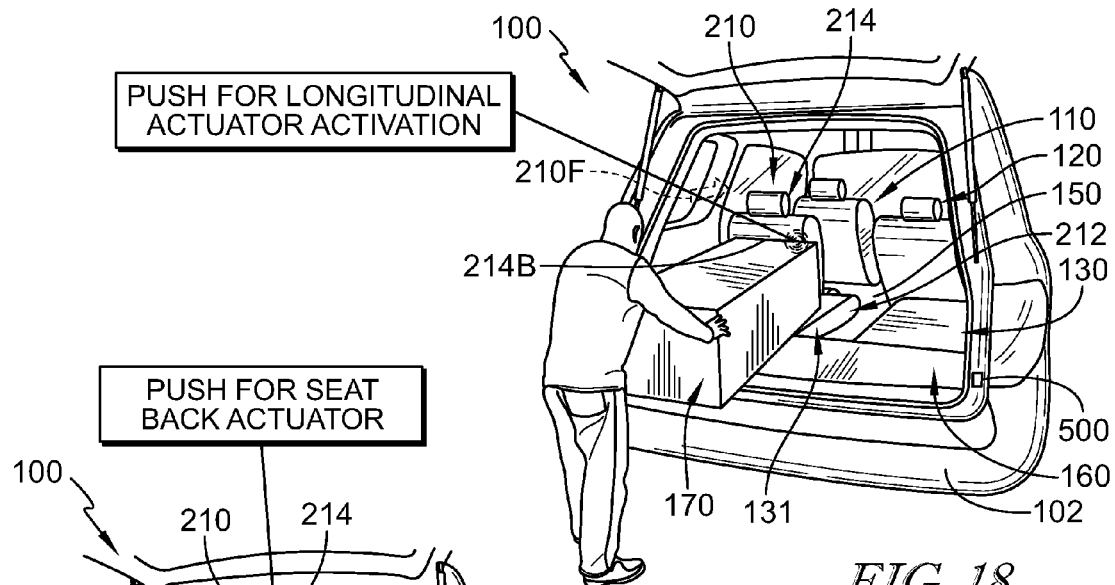
Figure 19:
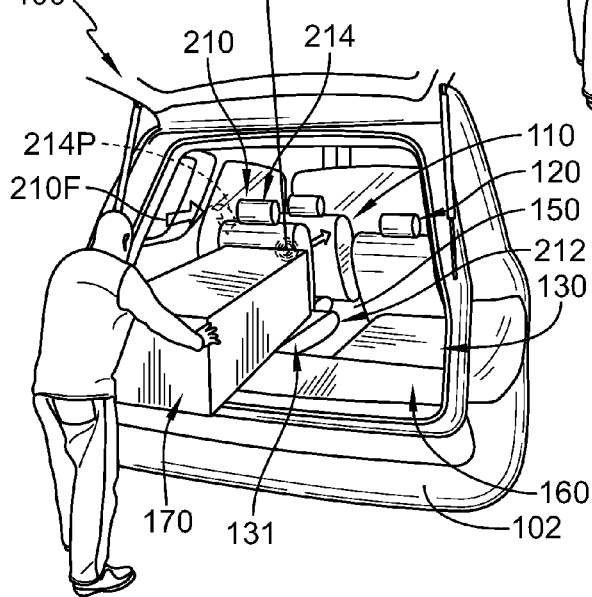
Figure 20:
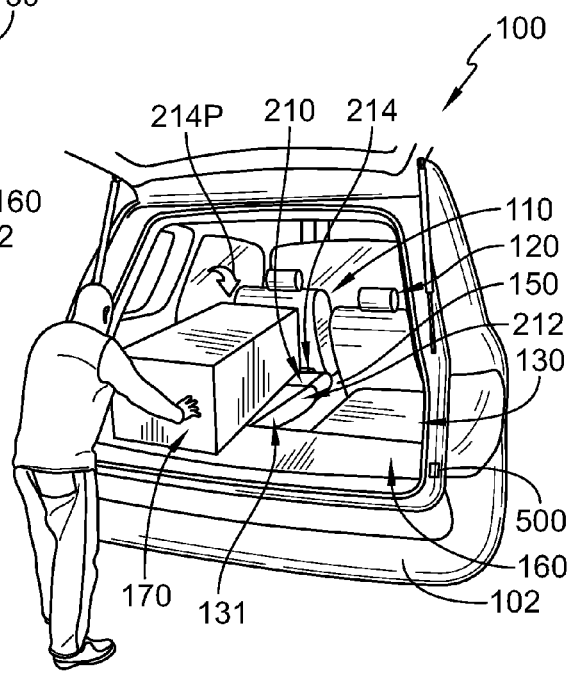
Figure 21:
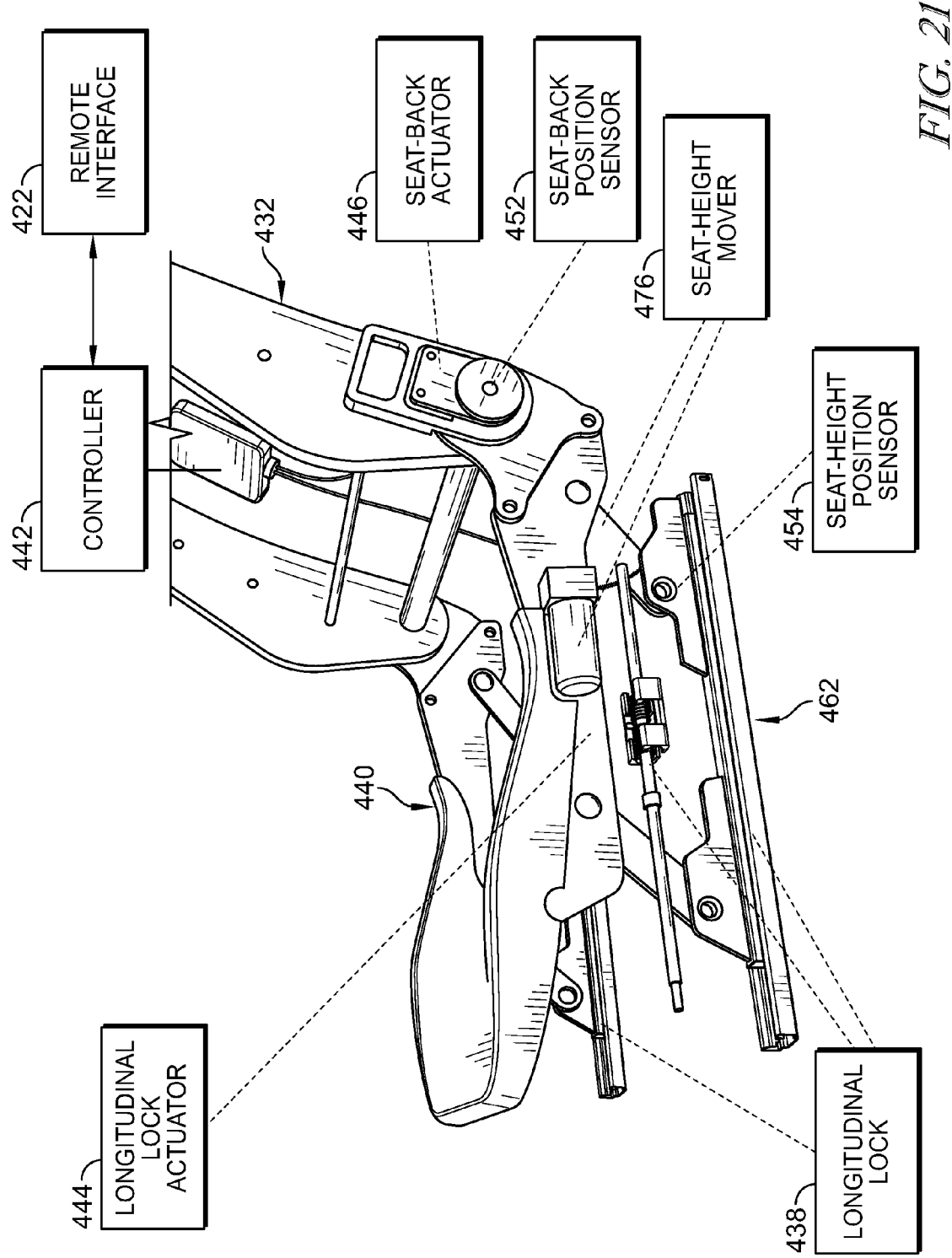
Figure 22:
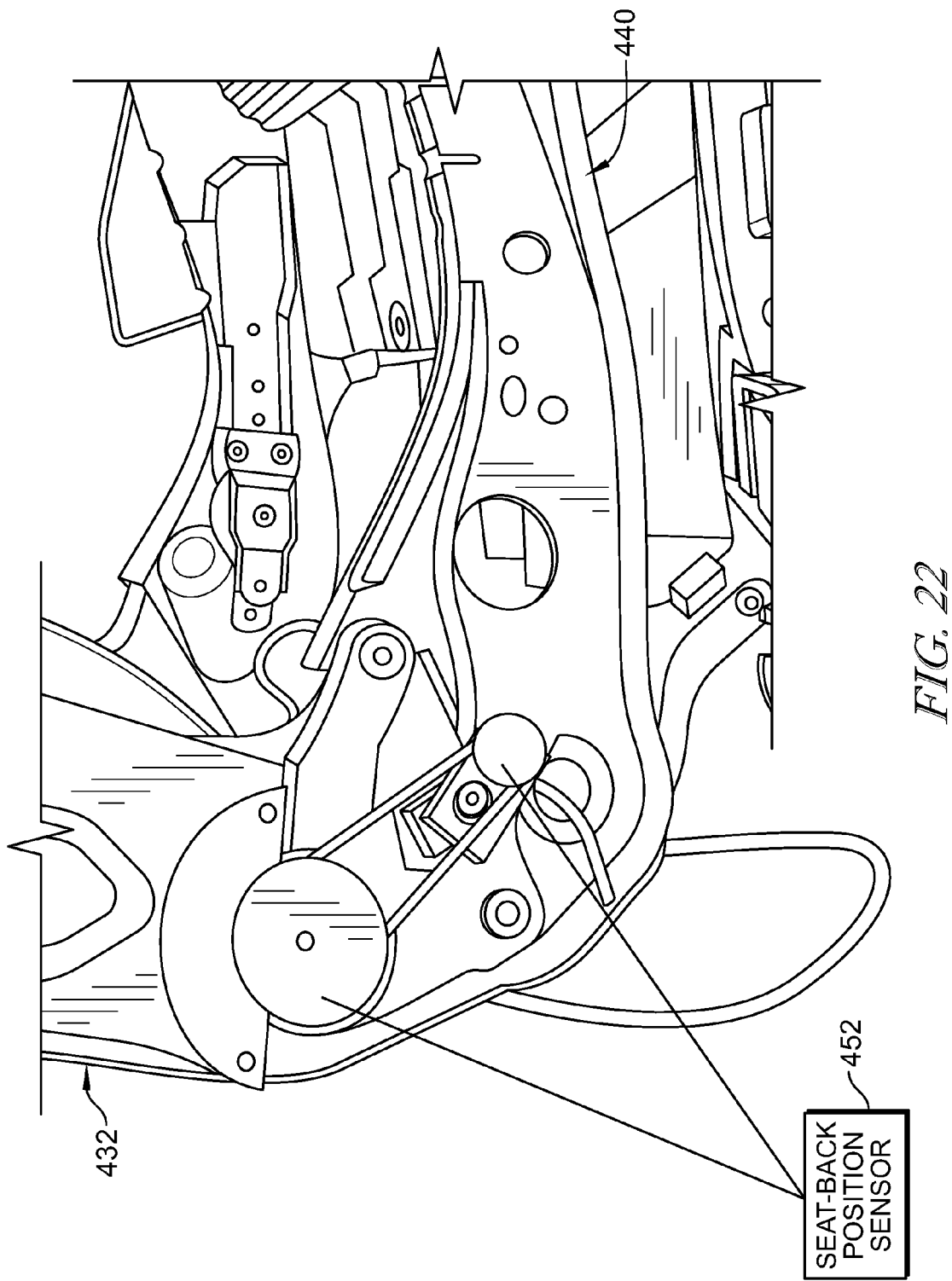
Figure 23:
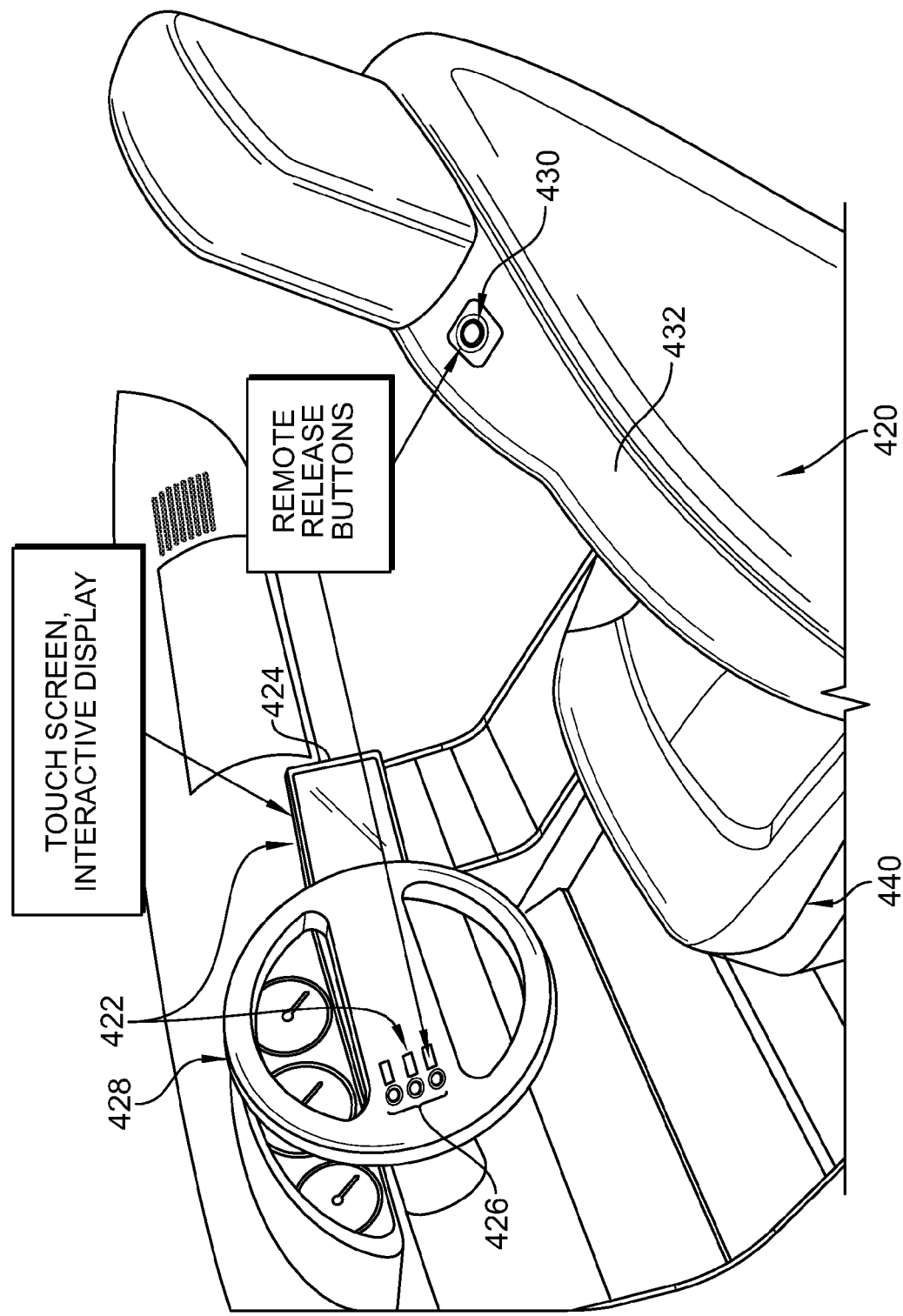
Figure 24:
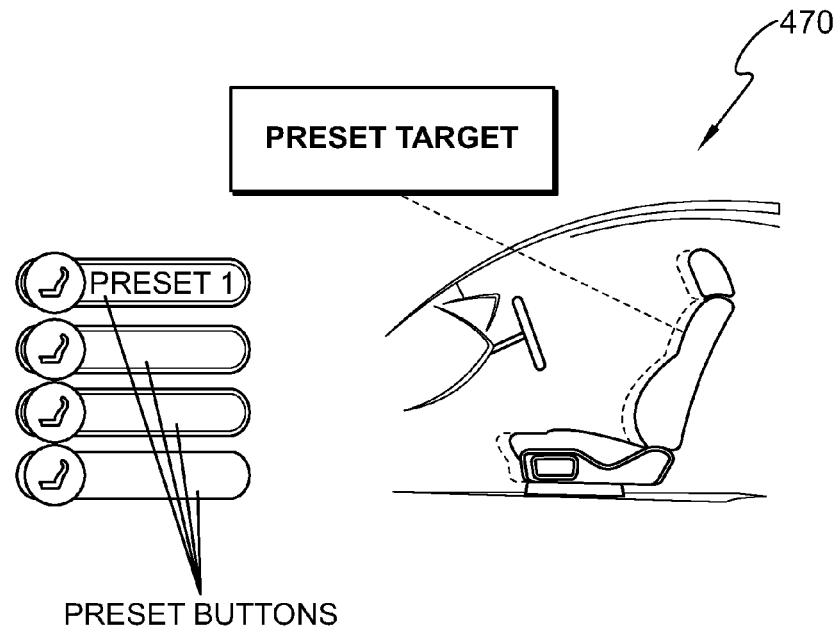
Figure 25:
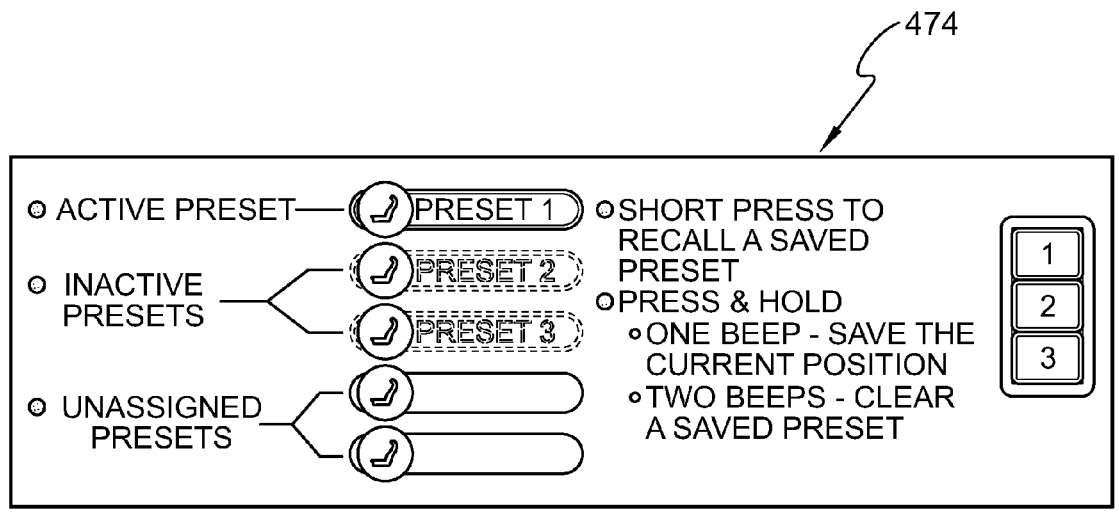
Figure 26:
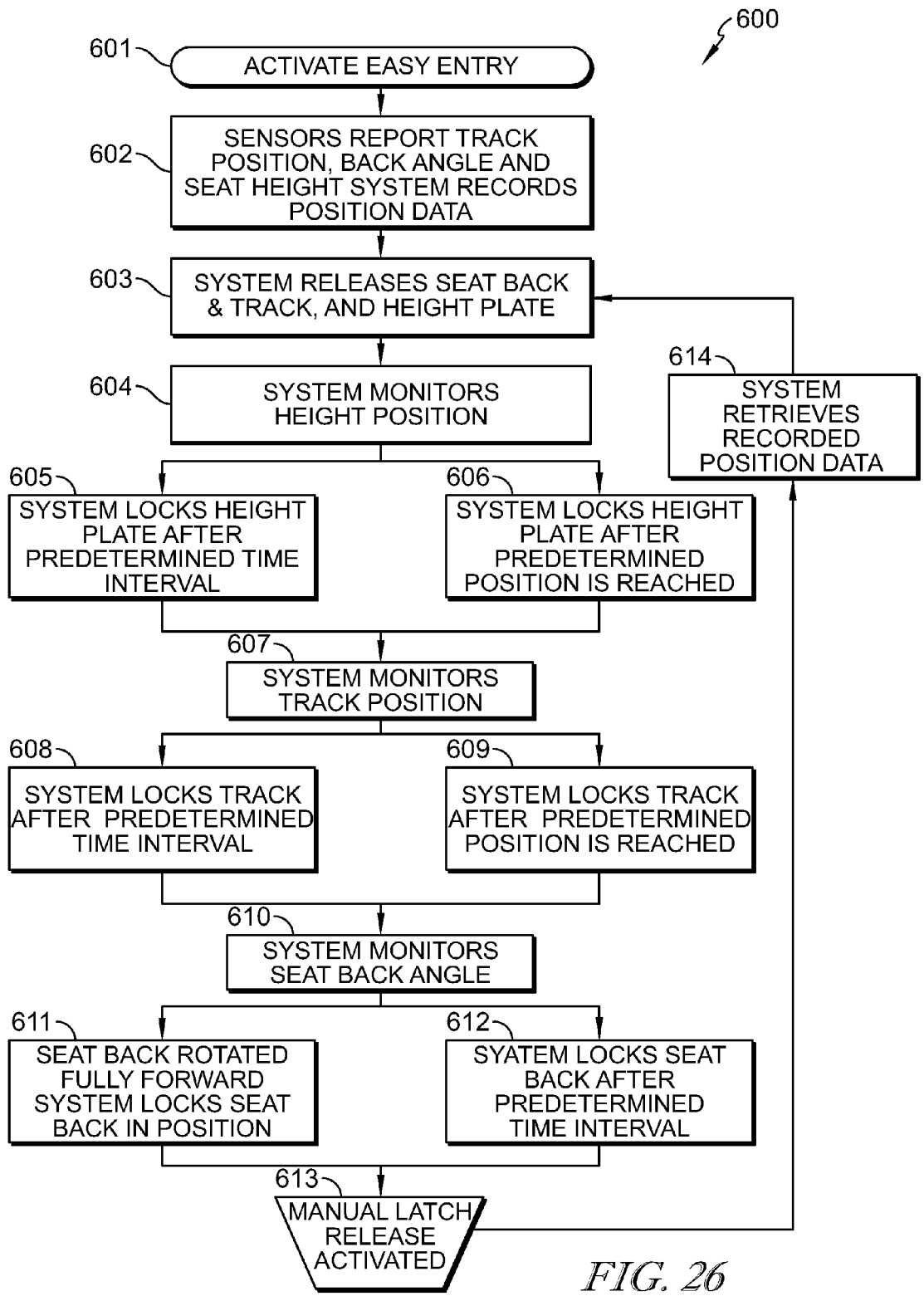

FIGS. 6, 7, and 8 are side perspective views of the passenger vehicle shown in FIG. 1 showing that the second-row vehicle seat may be moved forward along the floor away from the third-row vehicle seats and toward the first-row vehicle seats in response to a user applying a two-tap gesture onto the back side of the seat back included in the second-row vehicle seat so that the second-row vehicle seat may be rearranged within the passenger vehicle to allow for cargo storage behind the second-row vehicle seat and showing that the second-row vehicle seat may be moved backward along the floor away from the first-row vehicle seats and toward the third-row vehicle seats in response to a user applying a force onto the front side of the seat back included in the second-row vehicle seat so that the cargo may be secured between the second-row and third-row vehicle seats;

FIG. 6 is a side perspective view of a passenger vehicle suggesting that the seat motion system may be configured to slide the second-row vehicle seat forward along the floor in response to a user applying a two-tap gesture onto a back side of the seat back so that the second-row vehicle seat may be rearranged within the passenger vehicle to allow for cargo storage behind the second-row vehicle seat;

FIG. 7 is a view similar to FIG. 6 showing the second-row vehicle seat moved forward along the floor away from the third-row vehicle seats and toward the first-row vehicle seats after a user applied a two-tap gesture onto the back side of the seat back of the second-row vehicle seat so that the second-row vehicle seat may be rearranged to allow for cargo storage behind the second-row vehicle seat and suggesting that the seat motion system may be configured to slide the second-row vehicle seat backward along the floor so that the second-row vehicle seat may be rearranged within the passenger vehicle to secure cargo between the second-row and third-row vehicle seats as shown in FIG. 8;

FIG. 8 is a view similar to FIGS. 6 and 7 showing the second-row vehicle seat moved backward along the floor away from the first-row vehicle seats and toward the third-row vehicle seats after a user applied a force onto the front side of the seat back included in the second-row vehicle seat so that the second-row vehicle seat may secure cargo between the second-row and third-row vehicle seats;

FIGS. 9A, 9B, 9C, 10A, 10B, 10C, 11A, 11B, 11C, 12A, 12B, and 12C are a series of diagrammatic views showing how each of the slide motor, recline motor, and height motor operates during cargo loading;

FIG. 9A is a diagrammatic view of the second-row vehicle seat shown in FIG. 4 showing that the controller has activated the slide motor to move the seat bottom forward along the track so that the seat bottom and the seat back slide forward along the track in response to a two-tap gesture being applied to the seat back;

FIG. 10A is a view similar to FIG. 9A showing that the controller has deactivated the slide motor to stop the seat bottom from moving forward along the track when the second-row vehicle seat has reached a full-forward position;

FIG. 11A is a view similar to FIGS. 9A and 10A of the second-row vehicle seat shown in FIG. 7 showing that the controller has activated the slide motor to move the seat bottom rearward along the track so that the seat bottom and the seat back slide backward along the track in response to a rearward slide motion-activation force being applied to the seat back;

FIG. 12A is a view similar to FIGS. 9A-11A of the second-row vehicle seat shown in FIG. 8 showing that the controller has deactivated the slide motor to stop the seat bottom from moving rearwardly along the track in response to the sensor unit in the seat back detecting an obstruction behind the second-row vehicle seat so that the obstruction may be secured but not squeezed by the second-row vehicle seat;

FIG. 9B is a diagrammatic view of the second-row vehicle seat similar to FIG. 9A showing that the controller has activated the recline motor to pivot the seat back forward towards the seat bottom in response to a three-tap gesture being applied to the seat back;

FIG. 10B is a view similar to FIG. 9B showing that the controller has deactivated the recline motor to stop the seat back from pivoting forward towards the seat bottom when the seat back has reached the full-forward position;

FIG. 11B is a view similar to FIGS. 9B and 10B of the second-row vehicle seat showing that the controller has activated the recline motor to pivot the seat back rearward towards the back of the vehicle so that the seat back rotates rearward relative the seat bottom in response to a rearward recline motion-activation force being applied to the seat back;

FIG. 12B is a view similar to FIGS. 9B-11B of the second-row vehicle seat showing that the controller has deactivated the recline motor to stop the seat back from rotating rearwardly about the pivot in response to the sensor unit in the seat back detecting cargo behind the second-row vehicle seat so that the cargo may be secured but not squeezed by the second-row vehicle seat;

FIG. 9C is a diagrammatic view of the second-row vehicle seat similar to FIG. 9A showing that the controller has activated the height motor to raise the seat bottom upward away from the floor in response to a four-tap gesture being applied to the seat back;

FIG. 10C is a view similar to FIG. 9C showing that the controller has deactivated the height motor to stop the seat back from raising when the seat bottom has reached the full-raised position;

FIG. 11C is a view similar to FIGS. 9C and 10C of the second-row vehicle seat showing that the controller has activated the height motor to lower the seat back down towards the floor so that the seat bottom lowers towards the floor in response to a rearward height motion-activation force being applied to the seat back;

FIG. 12C is a view similar to FIGS. 9C, 10C, and 11C of the second-row vehicle seat showing that the controller has deactivated the height motor to stop the seat bottom from lowering towards the floor in response to the sensor unit in the seat back detecting cargo beneath the second-row vehicle seat so that the cargo may be secured but not squeezed by the second-row vehicle seat;

FIG. 13 is a perspective and diagrammatic view of the vehicle seat motion system of an alternative embodiment showing that the vehicle seat may include a remote interface and a remote-actuation unit configured to provide remote actuation of actuators included in the various systems of the vehicle seat, a position-sensor unit configured to sense a longitudinal position of the vehicles seat, a force sensor configured to provide actuation of the seat actuators, a vertical position of the vehicle seat, and an angular position of the a seat back included in the vehicle seat, and a longitudinal infinite lock unit configured to selectively block movement of the vehicle seat relative to the vehicle floor along a longitudinal path at any position along the path;

FIG. 14 is an enlarged partial perspective and diagrammatic view of the smart-height system of FIG. 13 showing that the seat-height mover may include a seat-height actuator, a seat-height input plate, and a seat-height support link and that the seat-height position sensor may be coupled to the seat-height support link to sense a position of the seat-height support link;

FIG. 15 is a partial perspective and diagrammatic view of the vehicle seat of FIG. 14 showing a portion of the longitudinal lock unit coupled to a slide mechanism included in a seat-bottom mount and a longitudinal infinite-lock actuator coupled to a spring clamp included in the longitudinal infinite lock unit;

FIG. 16 is an exploded assembly view of the spring clamp of FIG. 13 showing that the spring clamp may include a guide rod coupled to the slide mechanism in a fixed position, a seat-bottom mount coupled to the guide rod to slide back and forth along the guide rod, and a torsion spring coupled to the guide rod to move between an engaged position in which a first friction force may engage the guide rod to block movement of the seat-bottom mount and seat-bottom relative to the floor and a disengaged position in which a relatively smaller second force may engage the guide rod and may enable movement of the seat-bottom relative to the floor;

FIG. 17 is a partial perspective and diagrammatic view of the vehicle seat of FIG. 14 showing a longitudinal position sensor a potentiometer strip coupled in a fixed position to a stationary portion of the slide mechanism included in the seat-bottom mount and a deflector coupled to a moving portion of the slide mechanism and configured to engage a portion of the potentiometer strip so that an absolute location of the vehicle seat along the longitudinal path is known;

FIGS. 18, 19, and 20 are rear perspective views of a second-row vehicle seat of FIG. 13 mounted in the passenger vehicle showing that the second-row vehicle seat may be moved forward along the floor toward the first-row vehicle seats in response to a package applying a force onto the back side of the seat back included in the second-row vehicle seat during loading of the package so that the second-row vehicle seat may be rearranged within the passenger vehicle to enable the package to be inserted into the passenger vehicle and showing that the seat back of the second-row vehicle seat may be pivoted down toward the seat bottom in response to further force applied by the package onto the back side of the seat back included in the second-row vehicle seat during loading of the package so that the second-row vehicle seat may be rearranged within the passenger vehicle to enable the package to be stowed on top of the second-row vehicle seat;

FIG. 18 is a rear perspective view of a passenger vehicle suggesting that the manual seat motion system of this passenger vehicle may be configured to unlock a second-row vehicle seat to permit the passenger to slide the vehicle seat forward along the floor in response to a package applying a force onto the back side of the seat back included in the second-row vehicle seat during loading of the package so that the second-row vehicle seat may be rearranged within the passenger vehicle to enable the package to be inserted into the passenger vehicle as shown in FIG. 19;

FIG. 19 is a view similar to FIG. 18 showing the second-row vehicle seat moved forward along the floor toward the first-row vehicle seats after the package has applied a force onto the back side of the seat back included in the second-row vehicle seat during loading of the package so that the second-row vehicle seat may be rearranged within the passenger vehicle to enable the package to be inserted into the passenger vehicle and suggesting that the seat motion system may be configured to unlock the seat back for the passenger to pivot the seat back of the second-row vehicle seat down toward the seat bottom in response to further force applied by the package onto the back side of the seat back as shown in FIG. 20;

FIG. 20 is a view similar to FIGS. 18 and 19 showing the seat back of the second-row vehicle seat may be pivoted down toward the seat bottom during loading of the package so that the second-row vehicle seat may be rearranged within the passenger vehicle to enable the package to be stowed on top of the second-row vehicle seat;

FIG. 21 is a partial exploded assembly and diagrammatic view of the vehicle seat of FIG. 13 showing the controller, the longitudinal lock actuator, the longitudinal lock, a seat height mover, and a seat height position sensor;

FIG. 22 is a photograph of a seat back position sensor coupled to both a seat back and a seat bottom included in the vehicle seat;

FIG. 23 is a photograph of a vehicle seat showing a remote interface that may include an interactive display, a first set of remote release buttons coupled to a steering wheel, and another remote release button coupled to a seat back of the vehicle seat;

FIG. 24 illustrates a display screen shown on the interactive display during use of the vehicle seat indicating that one or more positions of the vehicle seat may be stored in memory of the controller;

FIG. 25 illustrates another display screen shown on the interactive display during use of the vehicle seat indicating how to recall a saved position, how to store a position in memory, and how to clear a position from memory; and FIG. 26 is a diagrammatic view of a portion of a process showing how the controller uses the various sensors and systems to move the vehicle seat to the easy load arrangement.

DETAILED DESCRIPTION

When loading cargo into a vehicle, it is often difficult and slow to move seats to fit the cargo. This is particularly difficult when trying to load cargo through a trunk or rear hatch of a vehicle. Thus, the present disclosure relates to a seating system that provides the ability to move seating within the passenger vehicle by applying forces to the seat back with the cargo or a hand so that storage space is maximized. As suggested in FIG. 1, the vehicle seat includes a seat bottom mounted to a track to slide along the track relative to a floor of the vehicle, a seat back mounted to the seat bottom to pivot relative to the seat, a seat height adjuster mounted to the seat bottom to move the seat up and down relative to the floor, and a seat motion system coupled to the seat bottom and seat back and configured to provide means for moving the vehicle seat to a predetermined storage position in response to application of a predetermined force to the vehicle seat so that storage space in the vehicle is maximized while time and effort by the user is minimized.

The seat motion system (also called vehicle-seat motion system) includes the vehicle seat, a sensor unit coupled to the vehicle seat to sense an arrangement of the vehicle seat and forces applied to the vehicle seat, an actuation unit coupled to the vehicle seat to allow selective movement of the vehicle seat relative to a floor of the vehicle, and a controller coupled to the sensor unit and the actuation unit. The controller is configured to activate the actuation unit in response to a sensed force applied to the seat back to cause the vehicle seat to move to the predetermined storage arrangement and deactivate the actuation in response to sensing the vehicle seat in the predetermined storage arrangement so cargo storage in the vehicle is maximized while user effort and time is minimized.

The vehicle-seat motion system enables a user to move seats out of the way using a force, taps, or a predetermined pattern of forces (gestures) applied during loading of cargo into the vehicle. Cargo storage is maximized when cargo is loaded into the vehicle using the vehicle-seat motion system without having to access the vehicle seats from side doors.

The seat motion system enables the ability to rearrange the vehicle seat in response to forces exerted on the seat back within the passenger vehicle by sliding the seat bottom along the floor and/or pivoting the seat back relative to the seat bottom, and/or raising and lowering the seat bottom relative to the floor. In this way, the seating system provides a rearranged seat so that cargo may be loaded into the vehicle.

In one embodiment, the seat bottom may be coupled to a track mounted to the floor to slide on the track relative to the floor. The seat motion system includes a slide motor configured to move the seat bottom along the track. Additionally, a sensor unit is mounted in the seat back and configured to detect forces applied to front and back sides of the seat back. In some embodiments, the system may include a height motor mounted to raise and lower the seat relative to the floor and a recline motor mounted to pivot the seat back relative to the seat bottom.

As shown in FIG. 1, the second-row vehicle seat motion system may include a second-row vehicle seat 210 with a moveable seat back 214 and a moveable seat bottom 212 and powered means coupled to the second-row vehicle seat to rearrange the seat by sliding the seat bottom along the floor 150 as shown in FIG. 1. The means to rearrange the vehicle seat can include powered means consisting of a slide motor 218 coupled to the seat bottom 212 to move the seat bottom 212 along a track 215 on the floor.

The powered means may also include a sensor unit 222 coupled to the seat back 214 that detects forces applied to the seat back 214 and a controller 24 coupled to the slide motor 18 and the sensor unit 222. A power source 220 may be selectively coupled to the slide motor 218 by controller 224 to slide the seat bottom forward or backward along the track 215. The second-row vehicle seat may also include a recline motor 226 and/or a seat height motor 326.

Figure 2:
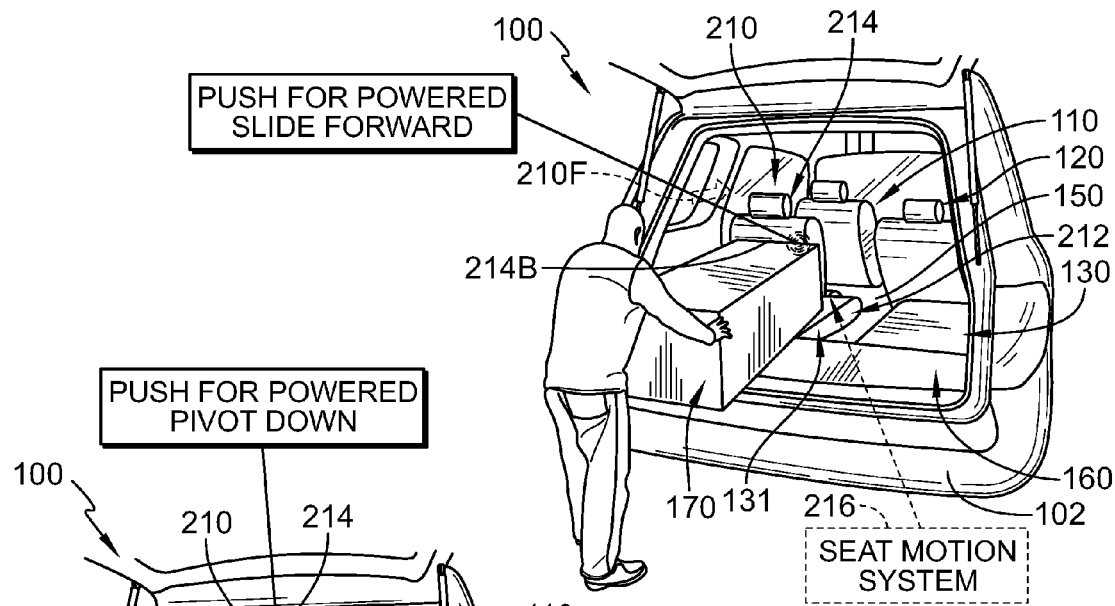
Figure 3:
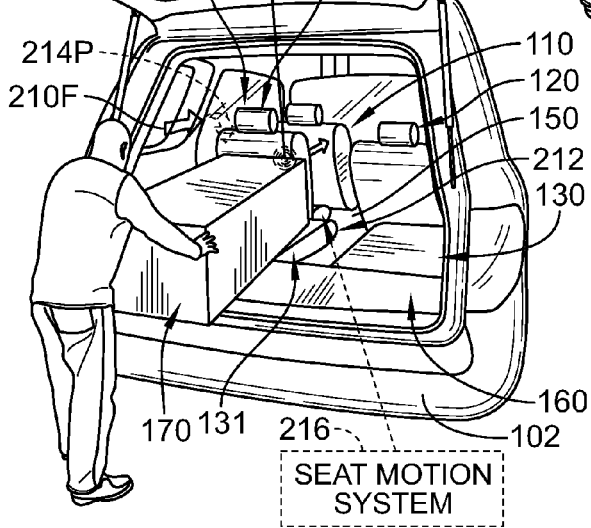

FIGS. 2-4 provide rear perspective views of another second-row vehicle seat mounted in the passenger vehicle of FIG. 1. The second-row vehicle seat may be moved forward along the floor toward the first-row vehicle seats in response to a package applying a force onto the back side of the seat back included in the second-row vehicle seat during loading of the package so that the second-row vehicle seat may be rearranged within the passenger vehicle to enable the package to be inserted into the passenger vehicle. The seat back of the second-row vehicle seat may be pivoted down toward the seat bottom in response to further force applied by the package onto the back side of the seat back included in the second-row vehicle seat during loading of the package. This enables the second-row vehicle seat to be rearranged within the passenger vehicle to enable the package to be stowed on top of the second-row vehicle seat.

The second-row vehicle seat 210 may be moved forward along the floor 150 toward the first-row vehicle seats 110, 120 in response to a package 170 applying a force 210F onto the back side of the seat back 214 during loading of the package through a rear hatch 160 of the passenger vehicle 100 as shown in FIGS. 2 and 3. Movement of the second-row vehicle seat 210 forward may enable the package 170 to be inserted into the passenger vehicle 100. The seat back 214 of the second-row vehicle seat 210 may be then pivoted down toward the seat bottom 212 in response to further force 214P applied by the package 170 onto the back side of the seat back 214. Thus, the second-row vehicle seat 210 may be rearranged within the passenger vehicle by a passenger standing in the rear hatch area to enable the package 170 to be stowed on top of the second-row vehicle seat 10 as shown in FIG. 4.

More particularly, the controller 224 may activate the slide motor 218 to move the seat bottom 212 forward along the track 215 in response to a package being pushed into contact with the seat back 214 through a rear hatch 160 of the passenger vehicle 100, for example, as shown diagrammatically in FIGS. 11 and 14. The controller 224 may deactivate the slide motor 218 to stop the seat bottom 212 from moving forward along the track 215 when the second-row vehicle seat 210 has reached the full-forward position, or if the second-row vehicle seat encounters an obstruction. The controller 224 may activate the recline motor 226 to pivot the seat back 214 forward to a folded down position in response to further pushing 214P of the package 170 into contact with the seat back 214 as shown in FIG. 4.

The controller may deactivate the slide motor 218 and the recline motor 226 in response to signals from an enablement unit. The enablement unit 225 may be configured to receive inputs used by the controller 242 to enable or disable movement of the second-row vehicle seat 210 in response to forces detected by the sensor unit 222. The enablement unit 225 may receive one or more user inputs, vehicle inputs, and/or environmental inputs that may be communicated to the controller 224 to determine if movement of the second-row vehicle seat 210 is allowable. The enablement unit 225 may include a proximity sensor configured to detect if an object is blocking movement of the seat bottom 212 and/or seat back 214 to disable movement of the seat bottom 212 and/or seat back 214 that could cause a collision with the detected object. The object may be, for example, another seat 110 in front of the seat sliding forward.

In one example, some vehicles may not have a slide motor. In those instances, application of cargo force from the rear vehicle hatch will activate the recline motor 226 and pivot the seat back forward to a folded position as shown in FIG. 3.

Additionally, the sensor unit 222 may detect forces applied to the face 214F and back 214B sides of the seat back 214, enabling loading of cargo in a side door of a vehicle. The controller 224 receives the signals indicative of the forces applied to the face and back sides 214F, 214B of the seat back 214 from the sensor unit 222 and may be configured to activate the slide motor 218 in response. Thus, the second-row vehicle seat motion system 216 provides powered means for rearranging the second-row vehicle seat 210 by moving the seat bottom 212 in response to a user applying a force onto the seat back 14 so that the second-row vehicle seat 210 may allow for cargo storage in front of and/or behind the second-row vehicle seat 210.

The controller 224 may be configured to activate the slide motor 218 to slide the second-row vehicle seat 210 in response to forward slide motion-activation forces 30 and in response to rearward slide motion activation forces 240 as shown in FIG. 1. Forward slide motion-activation forces 30 may be induced by a push 31, a pull 32, or a gesture 33 applied to the seat back 14B. Rearward slide motion-activation forces 40 may similarly be induced by a push 41, a pull 42, or a gesture 43.

Controller 24 may be implemented in software and compiled and stored to a memory as object code. During operation of methodologies in accordance with the present disclosure, the software for controller 24 may be invoked for execution by a processor. In one implementation, the controller 24 is implemented as a single system on a chip. Controller 24 may communicate with other components in vehicle 100 through any suitable electronic communication mechanism, such as a communication bus or cabling. In other implementations, cargo-management controller 24 may be implemented on separate hardware modules placed in communication with one another through any suitable electronic communication mechanism, such as a communication bus or cabling.

Figure 5:
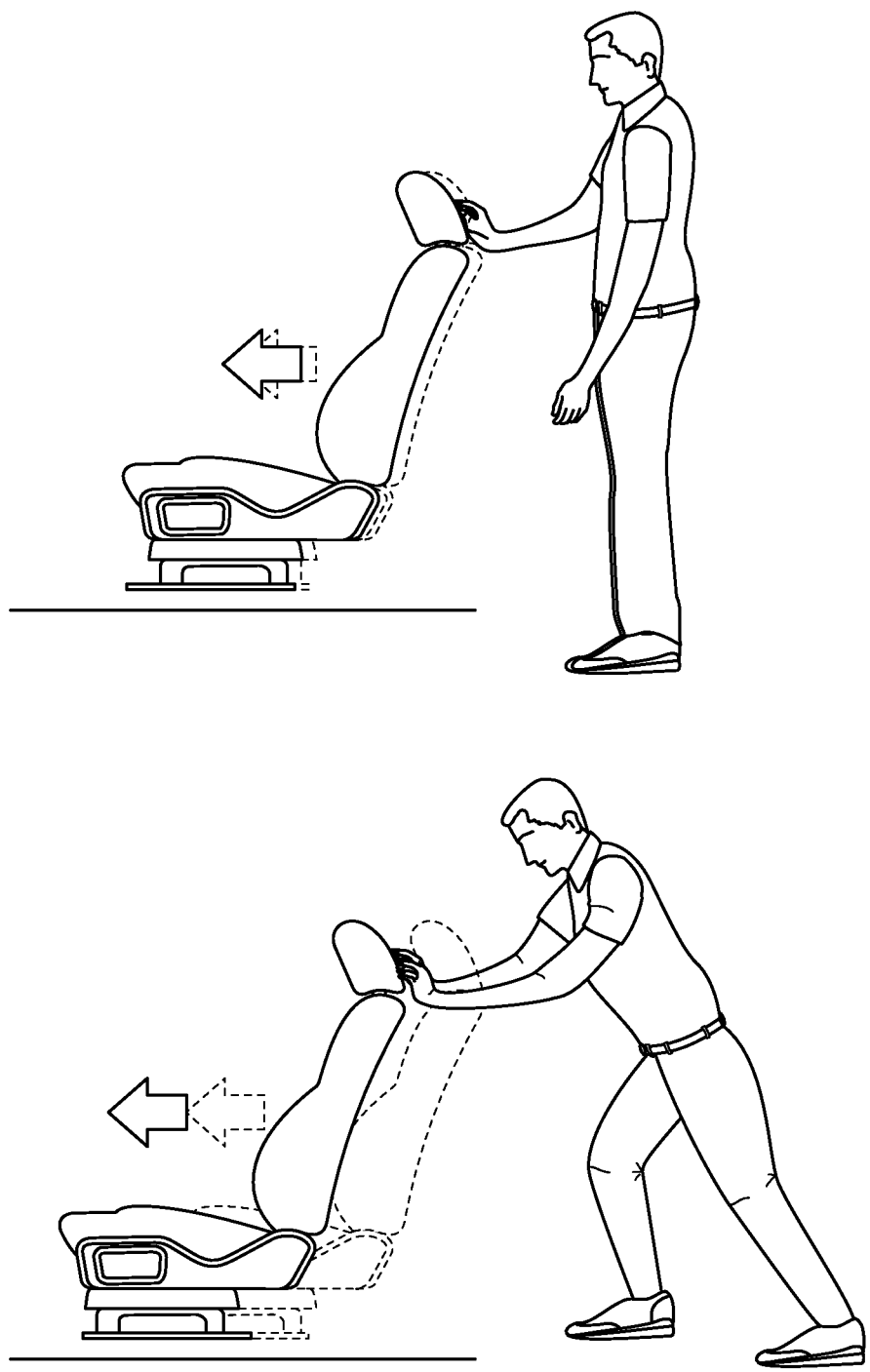
FIG. 5 is a diagrammatic view of a second-row vehicle seat as shown in FIG. 1 showing the relationship between force applied to the seat back and speed of seat movement.

FIG. 5 is an illustrative view of a second-row vehicle seat as shown in FIG. 14 showing the relationship between force applied to the seat back and speed of seat movement. The controller 24 may be configured to adjust the speed of slide motor 18 based on the amount of force applied to the seat back as shown in FIG. 5. Generally, the more force that may be applied, the faster the controller 24 operates the slide motor 18. These speed adjustments provide tactile force feedback to the user.

FIGS. 6-8 are side perspective views of the passenger vehicle shown in FIG. 1 showing that the second-row vehicle seat may be moved forward along the floor away from the third-row vehicle seats and toward the first-row vehicle seats in response to a user applying a two-tap gesture onto the back side of the seat back included in the second-row vehicle seat so that the second-row vehicle seat may be rearranged within the passenger vehicle to allow for cargo storage behind the second-row vehicle seat. FIG. 7 shows that the second-row vehicle seat may be moved backward along the floor away from the first-row vehicle seats and toward the third-row vehicle seats in response to a user applying a force onto the front side of the seat back included in the second-row vehicle seat. FIG. 8 shows the cargo may be secured between the second-row and third-row vehicle seats.

Gestures 33, 34 may be predetermined sequences of force input from a user as illustrated by the two-tap gesture as suggested in FIG. 6. The controller 24 may be configured to activate the slide motor 18 to slide the vehicle-seat 10 to a full forward position 10F towards the front of the vehicle 101 in response to a user applying two taps (two-tap gesture) onto the back side 14B of the seat back as shown in FIGS. 1 and 6. Another exemplary gesture recognized by the controller 24 may be a two-tap gesture on the face side 14F of the seat back 14 to cause the second-row vehicle seat 10 to slide to a full back position 10R towards the back of the vehicle 102. Other gestures may be programmed into and implemented by the controller 24.

In accordance with this embodiment, the second-row vehicle seat 14 may be moved forward along the floor 150 toward the first-row vehicle seats 110 as shown in FIGS. 6-8, 9A, 10A and 11A.

In a method of operation, the second-row vehicle seat 10 may be moved forward along the floor 150 towards the first row of seats 110 in response to a user applying a two-tap gesture via cargo or a free hand on the back side 14B of the seat back 14 as illustrated in FIGS. 6-7 and 9A-10A. Movement of the second-row vehicle seat 10 rearranges the passenger vehicle 100 to allow for cargo 180 to be stored behind the second-row vehicle seat 10 as shown in FIGS. 7 and 10A.

The second-row vehicle seat 10 may be then moved backward along the floor away from the first-row vehicles seats 110 in response to a user applying a force, or gesture onto the face 14F of the seat back 14 so that the cargo 180 may be secured between the second row second-row vehicle seat 10 and third row second-row vehicle seats 130, 131 as shown in FIG. 7. The controller 24 may detect when a predetermined amount of resistance may be applied by the cargo 180 on the back side 14B of the seat back 14 and the controller 24 may stop movement backwards as indicated in FIGS. 8 and 11A.

FIGS. 9B-12C show how the controller activates recline motor and height motor operate during cargo loading in response to activation forces For example, the second-row vehicle system may include the slide motor 18 described above and/or recline motor 226 connected to the controller 24 and sensor unit 22 to pivot 14A the seat back 14 about the seat bottom 12 as seen in FIG. 1. The controller 24 may receive signals indicative of forces 50, 60 applied to the face and back sides 14F, 14B of the seat back 14 from the sensor unit 22 and may be configured to activate the recline motor 226 by selectively coupling the power source 20 to the recline motor 226 in response. Thus, the second-row vehicle seat motion system can include a recline motor 226 to rearrange the second-row vehicle seat 10 by pivoting the seat back 14 in response to a user applying a force 50, 60 onto the seat back 14 so that the second-row vehicle seat 10 may allow for cargo storage in front of and/or behind and/or on top of the second-row vehicle seat.

The controller 24 may be configured to activate recline motor 226 to pivot the seat back 14 in response to forward pivot activation forces 50 and in backwards response to rearward pivot activation forces 60 as illustrated in FIG. 1. Forward pivot activation forces 50 may be induced by a push 51, a pull 52, or a gesture 53 applied to the seat back 14B. Rearward pivot activation forces 60 may similarly be induced by a push 61, a pull 62, or a gesture 63.

The controller 24 may be configured to activate the recline motor 226 to pivot the vehicle-seat 10 to a full forward position in response to a user applying three taps (three-tap gesture) onto the back side 14B of the seat back as illustrated in FIGS. 9B and 10B. Another exemplary gesture recognized by the controller 24 may be a three-tap gesture on the face side 14F of the seat back 14 to cause the second-row vehicle seat 10 to slide to a full backward position away from seat bottom 12 towards the third row of vehicle seats 130, 131. Other gestures may be programmed into and implemented by the controller 24.

In a method of operation, the second-row vehicle seat 10 may be rotated forward 214P about pivot point 14A towards seat bottom 12 in response to the user applying a three-tap gesture 53 on the back side of the seat back 14 as illustrated in FIG. 9B. Movement of the seat back 14 towards the seat bottom 12 may enable cargo 180 to be stored on top of and/or behind the seat back as shown diagrammatically in FIG. 10B. The controller 24 may deactivate the recline motor 226 once the seat back is rotated fully forward to seat bottom 12 as shown in FIG. 8B. The controller 24 may activate the recline motor 226 to pivot the seat back 14 away from the seat bottom 12 in response to a user applying a force 60 in FIG. 11B to the face 14F of the seat back 14 so that the second-row seat may be in a configuration to secure the cargo 180 as shown in FIG. 12B.

The second-row vehicle seat motion system can include the slide motor 18 described above and/or recline motor 226, and/or a height motor 326 connected to the controller 24 and sensor unit 22 to raise and lower the second-row vehicle seat 10 vertically relative to the floor 150 as shown in FIG. 1. The controller 24 may receive signals indicative of forces 70 80 applied to the face and back sides 14F, 14B of the seat back 14 from the sensor unit 22 and may be configured to activate the height motor 326 by selectively coupling the power source 20 to the height motor 326 in response. Thus, the second-row vehicle seat motion system can include a height motor 326 to rearrange the second-row vehicle seat 10 by raising and lowering the second-row vehicle seat 10 in response to a user applying forces onto the seat back 70, 80 so that the second-row vehicle seat 10 may allow for cargo storage above and/or below the second-row vehicle seat.

The controller 24 may be configured to activate height motor 326 to raise and lower the second-row vehicle seat 10 in response to raise activation forces 70 and in response to lower activation forces 80 as illustrated in FIG. 1. Raise activation forces 70 may be induced by a push 71, a pull 72, or a gesture 73 applied to the seat back 14. Lower activation forces 80 may similarly be induced by a push 81, a pull 82, or a gesture 83.

The controller 24 may be configured to activate the height motor 326 to raise the vehicle-seat 10 to a full raised position in response to a user applying four taps (four-tap gesture) onto the back side 14B of the seat back as shown in FIGS. 9C-10C. Another exemplary gesture recognized by the controller 24 may be a four-tap gesture on the face side 14F of the seat back 14 to cause the second-row vehicle seat 10 to lower to a full lowered position. Other gestures may be programmed into and implemented by the controller 24 to operate the slide motor, recline motor, and height motor individually, or in combination.

In a method of operation, the second-row vehicle seat 10 may be raised away from the floor in a vertical direction 315 in response to the user applying a four-tap gesture 73 on the back side 14B of the seat back 14 as illustrated in FIG. 9C. More particularly, the controller 24 may activate the height motor 326 so that the seat bottom 12 rises vertically away from the floor 150 in response to a four-tap gesture 73 being applied to the seat back 14 as shown diagrammatically in FIG. 9C. The controller 24 may deactivate the height motor to stop the seat bottom 12 when the second-row vehicle seat has reached its upmost position as shown in FIG. 10C to accommodate cargo (180). The seat bottom 12 is then lowered towards the floor 150 in response to the user applying a force 80 in FIG. 11C to the face of the seat back 14 so that the second-row seat 10 may be in a configuration to secure the cargo as shown in FIG. 12C.

It is contemplated that some or all of the track operations FIGS. 9A-12A, seat back operations, FIGS. 9B-12B, and height operations FIGS. 9C-12C may be implemented together in a method to adjust the seat bottom, seat back, and overall seat height to accommodate cargo 180 in the passenger vehicle 100.

The seat motion system may include an optional enablement unit 225 coupled to the controller 224 as shown diagrammatically in FIG. 13.

The enablement unit 225 of one exemplary embodiment may include an enablement button pressed by a user to enable movement of the seat bottom 212, the seat back 214, and overall seat height for a programmed predetermined time period. In another example, the enablement unit 225 may include a vehicle condition sensor configured to detect if the vehicle is moving to disable movement of the seat bottom 212 and seat back 214 while moving The enablement unit 225 may include a proximity sensor configured to detect the proximity of a particular vehicle key fob to disable movement of the seat bottom 212 and seat back 214 while the key fob is in or around the passenger vehicle 100. In yet another example, the enablement unit 225 may include a door (or gate) sensor configured to detect open/closed arrangement of the door or gate to disable movement of the seat bottom 212 and seat back 214 while the door (or gate) is closed. In yet another example, the enablement unit 225 may be a force sensor configured to detect if a passenger is seated on the seat bottom 212 of second-row vehicle seat 210 to disable movement of the seat bottom 212 and seat back 214 if a passenger or object may be placed on the seat bottom 212. In some embodiments, the enablement unit 225 may include a combination of sensors, inputs, etc. that may be considered as part of a predetermined routine to enable or disable certain operations performed by the seat motion system 216.

The second-row vehicle seat motion system may optionally include a position sensor unit 290 coupled to the controller 224 as shown diagrammatically in FIG. 1. The position sensor unit 290 of one exemplary embodiment may include sensors configured to sense and record in the memory of the controller 224 the initial longitudinal seat position relative to the floor and seat back angle positions of the second-row vehicle seat prior to movement of the seat. A gesture of a predetermined sequence of forces may be programmed into the vehicle seat motion system 216, applied to the seat back 214 and recognized by the controller 224 to cause the second-row vehicle seat to return to its stored initial longitudinal and seat back angle and seat height positions.

In another embodiment, the seat motion system may include a remote interface and a remote-actuation unit configured to provide remote actuation of actuators included in the various systems of the vehicle seat. In accordance with this embodiment, a position-sensor unit may be configured to sense a longitudinal position of the vehicles seat, a vertical position of the vehicle seat, and an angular position of a seat back included in the vehicle seat. Additionally, a longitudinal infinite lock unit may be configured to selectively block movement of the vehicle seat relative to the vehicle floor along a longitudinal path at any position along the path.

Thus, as illustrated in FIG. 13, a second-row vehicle seat motion system may include a second-row vehicle seat 410 with a moveable seat back 432 and a moveable seat bottom 440, a sensor unit 436 to sense seat position, means for rearranging the seat including actuation means 438, 462 coupled to a seat bottom to slide the seat bottom along the vehicle floor 418 and a controller 442 coupled to a force sensor unit 22, and position sensor unit 436. Force sensor unit 22 includes, for example, one or more sensors coupled to the vehicle seat. The sensors may be coupled to a seat back, a seat bottom, a slide track, combinations thereof, or any other suitable location.

Controller 442 may be implemented as described above with respect to controller 24. The controller 442 may receive an activation signal from the force sensors to activate the actuation means 438, 462 which enables the user to manually move the second-row vehicle seat 410 to a predetermined arrangement to allow for cargo storage in front of or behind the second-row vehicle seat. The controller 442 further may deactivate the actuation means 438 upon receipt of a signal from the position sensor unit 436 indicating the predetermined cargo storage arrangement has been reached.

FIG. 14 is an enlarged partial perspective and diagrammatic view of the smart-height system of FIG. 13 showing that the seat-height mover may include a seat-height actuator, a seat-height input plate, and a seat-height support link and that the seat-height position sensor may be coupled to the seat-height support link to sense a position of the seat-height support link. As shown in FIG. 14, the seat height actuator 478 is part of a seat height mover unit 476 that unlocks a seat height input plate 480 and seat height support link 482 of the seat height mover 476 to enable the seat to be raised and lowered to maximize space for passenger entry above and/or below the seat.

The longitudinal infinite lock unit may be coupled to a slide mechanism included in a seat-bottom mount and a longitudinal infinite-lock actuator coupled to a spring clamp included in the longitudinal infinite lock unit as shown in FIG. 15. The spring clamp may include a guide rod coupled to the slide mechanism in a fixed position, a seat-bottom mount coupled to the guide rod to slide back and forth along the guide rod, and a torsion spring coupled to the guide rod to move between an engaged position in which a first friction force engages the guide rod to block movement of the seat-bottom mount and seat-bottom relative to the floor and a disengaged position in which a relatively smaller second force engages the guide rod and enables movement of the seat-bottom relative to the floor as shown in FIG. 16.

A longitudinal position sensor in accordance with the present disclosure is shown, for example, in FIG. 17. A potentiometer strip may be coupled in a fixed position to a stationary portion of the slide mechanism seat-bottom mount and a deflector coupled to a moving portion of the slide mechanism; in such an implementation, the moving portion is configured to engage a portion of the potentiometer strip so that an absolute location of the vehicle seat along the longitudinal path may be known.

The actuation means can include a longitudinal lock unit 438 adapted to enable the seat bottom 440 to slide along the vehicle floor 418 and be arranged at any position along a track 462 as well as a longitudinal lock actuator 444 adapted to release the longitudinal lock unit 438 from a locked position as shown in FIGS. 15-17. Longitudinal lock unit 438 may enable seat bottom 440 and seat back 432 to move on a slide mechanism 458 included in a seat-bottom mount 440 and be retained at any position along the longitudinal path. Longitudinal lock unit 438 may be used in cooperation with a controller 442 and remote actuation unit 434 or with a manual actuator in which force may be applied by the passenger or cargo held by the passenger. Reference is hereby made to U.S. Pat. No. 6,113,051 issued Sep. 5, 2000 and entitled SLIDE FOR AUTOMOBILE VEHICLE SEATS and U.S. Pat. No. 6,505,805 issued Jan. 14, 2003 and entitled VEHICLE SLIDE LOCK for disclosure relating to slide mechanisms and longitudinal lock units, which applications are hereby incorporated in its entirety herein.

Thus, for example, the manual actuator can include a force sensor unit, such a unit 22 described in relation to the embodiment of FIG. 1 herein. The user may apply, with cargo or a free hand, a force or gesture on the seat back 432 programmed to activate the longitudinal lock actuator 444, the seat back actuator 446, and/or the seat height actuator 478 to enable movement of the seat by the user to a predetermined arrangement. For example, the three-tap gesture as described above may be used to unlock the longitudinal lock actuator 444 to release the seat bottom 440 enable the user to slide the second-row vehicle seat 410 forward to load cargo behind second-row vehicle seat 410.

Longitudinal lock unit 438 may include a guide rod 464 coupled to slide mechanism 458 in a fixed position, a seat-bottom mount 440 coupled to a guide rod 464 to slide back and forth along guide rod 464, and a spring clamp 468 as shown in FIGS. 13, 15, and 16. When longitudinal lock unit 438 is in the engaged or locked position, a first friction force may engage guide rod 464 to block movement of seat-bottom mount 466 and seat bottom 440 relative to vehicle floor 418. When longitudinal lock unit 438 is in the disengaged position, a relatively smaller second force may engage guide rod 464 and may enable movement of seat bottom 440 relative to vehicle floor 418. In one illustrative example, spring clamp 468 may be a torsion spring and the torsion spring may be moved by the associated Bowden cable 448A, 448B which may be coupled to longitudinal infinite-lock actuator 444 as seen in FIGS. 16-17.

Longitudinal lock unit 438 may allow for the passenger to move second-row vehicle seat 410 and lock it at any location along the longitudinal travel path of second-row vehicle seat 410. Longitudinal infinite lock unit 438 also provides for an enhanced more premium feel to the passenger while maximizing value and minimizing waste.

A second-row vehicle seat of FIG. 13 mounted in the passenger vehicle showing how the second-row vehicle seat may be moved as suggested in FIGS. 18-20. For example, the second-row vehicle seat may be moved forward along the floor toward the first-row vehicle seats in response to a package applying a continuous force onto the back side of the seat back included in the second-row vehicle seat during loading of the package so that the second-row vehicle seat may be rearranged within the passenger vehicle to enable the package to be inserted into the passenger vehicle. The seat back of the second-row vehicle seat may be pivoted down toward the seat bottom in response to further force applied by the package onto the back side of the seat back included in the second-row vehicle seat during loading of the package so that the second-row vehicle seat may be rearranged within the passenger vehicle to enable the package to be stowed on top of the second-row vehicle seat as shown in FIG. 19.

Thus, in a method of operation of the alternative second-row vehicle seat 210, the second row longitudinal lock actuator 444 may be activated to enable a passenger to move the seat 210 longitudinally along the floor of the vehicle in a forward direction towards the first row of seats 111, 110 in response to a package 170 applying a force to the back side 214F of the seat back 214 during loading of the loading of the cargo through rear hatch 160 of the passenger vehicle 100. The force may be sensed by a sensor unit 22 similar to the sensor unit disclosed in of FIG. 1. Continuous force may result in manual movement of the second row vehicle seat 214 forward and may enable the package 170 to be inserted into the passenger vehicle 100.

The seat back 214 of the second row second-row vehicle seat may be released via a seat back actuator 446 and pivoted down toward the seat bottom 212 in response to further force applied by the package 170. Thus, the second-row vehicle seat 214 may be rearranged within the passenger vehicle to enable the cargo 170 to be stowed on top of the second-row vehicle seat as shown in FIG. 19.

In such an implementation, there may optionally be a release button 500 located in the vehicle hatch. Upon activation of the release button 500, the position sensor unit 436 may record the initial seat position data of the second-row seat 210 prior to the package exerting a force on the seat. Release button 500 may be activated again upon unloading the package 170 and the controller 442 may recall the stored initial position. The controller 442 may then release the track and/or seat back and lock them once controller 442 determines from the position sensors 436 that the second-row vehicle seat is in the initial position.

In some embodiments, the second-row vehicle seat may not be equipped with a longitudinal lock actuator 444 and may only have a seat back actuator 446. In those embodiments, the seat back actuator 446 may release the seat back in response to the force exerted by the cargo and the seat back will pivot down towards the seat bottom and lock, as previously described in FIGS. 19-20.

In an embodiment, a seat controller may be included on the seat itself. Thus, as illustrated in FIG. 21, controller 442 may be a controller included in the vehicle and not included in any specific second-row vehicle seat or vehicle system. Controller 442 may be coupled to remote interface 422 to send and receive information. Controller 442 may be further coupled to position-sensor unit 436 to receive sensor data about second-row vehicle seat 410. Controller 442 may be also coupled to remote-actuation unit 434 to cause longitudinal lock unit 438 to move between engaged and disengaged positions. Thus, as illustrated in FIGS. 15-17, position-sensor unit 436 may be coupled to controller 442 and configured to sense the longitudinal position of second-row vehicle seat 410, the vertical position of second-row vehicle seat 410, and the angular position of seat back 410 as various actuators 444, 446, 478 move second-row vehicle seat 410.

As illustrated in FIG. 21, position-sensor unit 436 may include a longitudinal position sensor 450, a seat-back position sensor 452, and a seat-height position sensor 454. Longitudinal position sensor 450 may determine the longitudinal position of second-row vehicle seat 410 along the longitudinal path of second-row vehicle seat 410 relative to vehicle floor 418. Seat-back position sensor 452 may determine an angular position of seat back 432 relative to seat bottom 440. Seat-height position sensor 454 may determine a vertical position of second-row vehicle seat 410 relative to vehicle floor 418.

One example of longitudinal position sensor 450 is shown in FIG. 17. Longitudinal position sensor 450 may include a potentiometer strip 456 coupled in a fixed position to a stationary portion of a slide mechanism 458 included in second-row vehicle seat 410 and a deflector 460 coupled to a moving portion of slide mechanism 458. Deflector 460 may be configured to engage a portion of potentiometer strip 456 so that absolute location of seat bottom 440 is known. Controller 442 may be coupled to longitudinal position sensor 450 to receive a signal therefrom indicative of an absolute position of second-row vehicle seat 410 relative to vehicle floor 418.

One example of seat-back position sensor 452 is shown in FIG. 22. As shown in that figure, the seat-back position sensor 452 may be coupled to both a seat back 432 and a seat bottom 440 included in the vehicle seat 410. Seat-back position sensor 452 may be, for example, a rotary potentiometer coupled to an inboard recliner included in seat back 432. In another example, seat-back position sensor 452 may be a hall-effect actuator used as seat-back actuator 446. Controller 442 may be coupled to seat-back position sensor 452 to receive a signal therefrom indicative of a position of seat back 432 relative to seat bottom 440.

The second-row vehicle seat motion system of FIG. 13 may also include a manual memory unit 412 including a remote actuation unit 434, the position sensor unit 36 and the longitudinal infinite lock unit 438 configured to store initial seat configurations sensed by sensor unit 436 and recall them for use at a later time.

One example of a remote interface that may include an interactive display, a first set of remote release buttons coupled to a steering wheel, and another remote release button coupled to a seat back of the vehicle seat as shown in FIG. 24. Likewise, One example of a display screen shown on the interactive display during use of the vehicle seat indicating that one or more positions of the vehicle seat may be stored in memory of the controller as shown in FIG. 24. Another display screen shown on the interactive display during use of the vehicle seat indicating how to recall a saved position, how to store a position in memory, and how to clear a position from memory as shown in FIG. 25.

The manual memory unit 412 may be configured to recall the second-row vehicle seat initial arrangement in response to a manual release or button 430. The controller 442 may be configured to activate actuation means 438 to enable the user to rearrange the second-row vehicle seat 410 back to its initial arrangement and deactivate the actuation means 442 locking the second-row vehicle seat 410 in position when the sensor unit 436 senses the seat is in the initial arrangement. The manual memory unit may also be configured to include seat back actuator 446 and seat height actuator 478.

In one example of use, a user may select a preset or stored arrangement of second-row vehicle seat 410 for cargo storage using remote interface 422. The passenger may push one of remote release buttons 426 or touch a graphic displayed on interactive display 424 depicted in FIG. 23. As shown in FIG. 24, a first graphic 470 may be displayed which shows how second-row vehicle seat can be adjusted as a result of engaging preset button 472. As a result of the passenger engaging preset button 472, controller 442 issues commands to remote-actuation unit 434 to cause actuators to move, enabling second-row vehicle seat 410 and seat back 432 to move, or to be manually moved, until the preset arrangement for cargo storage is sensed by position-sensor unit 436.

Another graphic 474, which may be displayed on interactive display 424, is shown in FIG. 25. Graphic 474 indicates how buttons on interactive display 424 and remote release buttons 426 may be used. In one example, controller 442 causes graphics 470, 474 to be displayed on the interactive display 424.

Controller 442 may also store programs in memory included in the controller that may be executed by a processor included in the controller. One example of a program may include a control process 600 stored in memory for using the easy-load second-row vehicle seat system.

A control process in accordance with the present disclosure is shown in FIG. 26. The controller uses the various sensors and systems to move the vehicle seat to the easy load arrangement. The control process begins with at 600, at which the controller may receive a command from a passenger that causes the controller to begin the easy load process at 601 as shown in FIG. 26.

The control process then proceeds to 602 at which the position sensor unit provides sensor data to controller for longitudinal position, seat back position, and seat height position for an initial arrangement. Control process then proceeds to 603 at which the system releases the seat back, the seat track, and the seat height plate. The system may then monitor the seat height position at 604 and lock the seat height plate after a predetermined height is reached at 605.

The predetermined height may be, for example, a height at which the seat is raised all the way up or lowered all the way down. This may maximize space for a package to be loaded below or above the seat.

The system may alternatively lock the height plate after a predetermined time interval at 606, if the predetermined height is not reached. The predetermined time interval may lapse when the passenger discovers he does not need to adjust the seat height to a predetermined height in order to load the package.

Control process then proceeds to 607, at which the system may monitor the track position. The system may either lock the track after a predetermined time interval at 608 if the predetermined position is not reached or lock the track after a predetermined position is reached at 609. For example, the passenger may not need to move the seat all the way to the predetermined track position in order to load the package into the vehicle. The predetermined position may be the forward-most or rear-most position along the track towards the front or back of the vehicle.

Control process then proceeds to 610, at which the system may monitor the seat back angle. When the seat back is rotated to a predetermined position, the system may lock the seat back in this position at 611. The predetermined position may be a position in which the seat back may be rotated all the way forward towards the seat bottom or all the way backwards away from the seat bottom. The system may alternatively lock the seat back after a predetermined time interval at 612. The predetermined time interval may occur when the passenger discovers he does not need to adjust the seat back to the predetermined position in order to load the package.

The passenger may optionally activate a manual latch release, detected at 613, once the package has been loaded, which causes the controller to retrieve the recorded position data at 614 and return to 603 at which the seat back, the track, and the seat height plate are released.

The manual release latch can be, for example, a predetermined gesture, or force pattern as described in relation to FIG. 1, or one of the preset remote release buttons 426, 430, 500 shown in FIGS. 20 and 22. The process then continues through operations 604-612, with the initial recorded position being used as the predetermined position in operations at 606, 609 and 611.

During the return to the initial recorded position, the system may lock at predetermined time intervals at 605, 608, 612 if the passenger determines the second-row vehicle seat cannot return to the initial recorded positions due to obstructions created by the loaded cargo.

The passenger may optionally activate the manual latch release, detected at 613 again, once the cargo has been unloaded. The system may once again retrieve the initial recorded position data at 614 and proceed through operations at 603-612 to return the seat to the initial recorded position.

In some embodiments, some or all of the sensors and releases utilized in the control process may be present. For example, a second-row vehicle seat in a coupe in the second row may not have a track or a seat height plate to adjust the longitudinal position or height. Therefore, the operations 604-609 associated with the track and seat height plate would be omitted. Likewise, some vehicles may not have a seat height plate on the second-row vehicle seats in the second row. Therefore, the system would only perform operations for monitoring and adjusting the track 607-609 and the seat back 610-612.

One example of a vehicle includes vehicle seats which may be moved between use arrangement and stowed arrangements. The stowed arrangements may be used when storing or transporting large cargo in the vehicle, for example, a Sport Utility Vehicle (SUV). In one example of use, a user may desire that both rear vehicle seats be in the stored arrangement so that large cargo may be placed thereon. As a result, the user must first open one rear passenger door and either manipulate manually one of the rear vehicle seats into the folded or stowed position or by pressing or holding buttons while waiting for the rear vehicle seat to fold in response to force applied by powered mechanisms. The user must then walk around the vehicle, open the other rear passenger door and repeat the process for the second rear vehicle seat. Thus, the user is presented with many different and time consuming steps before being able to load the relatively large cargo.

An easy load system in accordance with the present disclosure allows the user to move the rear vehicle seats out of the way by using pressure or taps from the cargo itself as it is being loaded into the vehicle from the trunk or rear hatch. This can be done by means of powered assist or manual effort. While the easy load system is used in the example of second or third row seats, the easy load system may be used with front row vehicle seats as well.

In another illustrative example, the vehicle seat when in the stored arrangement may be folded so as to provide a horizontal support surface for cargo to rest thereon. In another example, the vehicle seat when in the stored arrangement may also be moved forward away from the trunk or rear hatch. In another example, the vehicle seat when in the stored arrangement may be folded and moved forward away from the trunk or rear hatch.

In one example of use, the easy load system may be enabled as the user opens the trunk or rear hatch to load a relatively large or oversized package. In another example, the easy load system may be enabled by other vehicle factors such as the vehicle is in park or turned off. Once the easy load system is enabled, the vehicle seat responds when the user slides the package in and makes contact with the seat back. The contact is sensed by the easy load system and the motion device in the track, the recliner, or both is engaged. The motion device then moves the seat accordingly to make room for the package.

The input may be a tap or other predetermined pattern of forces applied to the vehicle seat or other suitable user interface. The easy load system senses the input and recognizes the input as one of a predetermined pattern of forces. As a result, the easy load system causes the vehicle seat to move to an arrangement associated with the predetermined pattern of forces. In one example, the tap is sensed and the easy load system causes the vehicle seat to move to make room for the package. In another example, continuous pressure is sensed and the easy load system allows the user to manually reposition the vehicle seat. Continuous pressure that enables a motor to move the vehicle seat at a speed relative to the force applied.

In vehicle seats that include both track and recline motors, proximity sensor(s) may determine the seat and track position. As a result, the easy load system may determine that sufficient clearance between the front vehicle seat and the rear vehicle seat is available to fold the seat back of the rear vehicle seat forward. A track position sensor may also be used in place or in combination with the proximity sensor.

While the disclosure herein is specifically directed toward a second-row vehicle seat, the disclosure may be equally applicable to vehicle seats arranged in any row of a passenger vehicle. Also, while the second-row vehicle seats of the present disclosure may be arranged in an automotive vehicle environment, the disclosure may be equally applicable second-row vehicle seats in other environments (e.g. boats, airplanes, trains, amusement rides, etc.). Further, such seats may also be used outside of vehicle environments (e.g. movie theaters, stadiums, etc.) without departing from the scope of the present disclosure.

The following numbered clauses include embodiments that are contemplated and non-limiting:

Clause 1

A vehicle seat motion system for loading cargo into a vehicle, the vehicle seat motion system comprising a vehicle seat including a bottom and a seat back coupled to the seat bottom to pivot about relative to the seat bottom, the seat bottom being adapted to slide back and forth along a floor of a vehicle, a remote interface unit, a sensor unit coupled to the vehicle seat to sense an arrangement if the vehicle seat relative to the floor, an actuator unit coupled to the seat bottom to cause the seat bottom to slide selectively relatively to the floor, and a controller configured to provide means for receiving a signal from the remote interface unit, activating the actuator unit in response to a sensed force applied to the seat back to facilitate moving the vehicle seat to a predetermined arrangement, and deactivating the actuation unit in response to sensing the vehicle seat in the predetermined arrangement so that storage space in the vehicle is maximized while time and effort expended by the user is minimized.

Clause 2

A vehicle seat motion system for loading cargo comprising a vehicle seat with a seat back and seat bottom, wherein the seat bottom is adapted to be mounted to a track to slide along the floor and the seat back is adapted to pivot about the seat bottom and powered means for rearranging the vehicle seat by sliding the seat bottom along the floor in response to a user and/or cargo applying force to a seat back to allow for cargo storage in front of or behind the seat.

Clause 3

The vehicle seat motion system of any other clause or combination of clauses, wherein the actuator unit includes a longitudinal lock unit adapted to enable the seat bottom to slide along the seat floor and a longitudinal lock actuator adapted to release the longitudinal lock unit from a locked position.

Clause 4

The vehicle seat motion system of any other clause or combination of clauses, wherein the controller deactivates the actuator unit in response to the predetermined arrangement not having been reached after a predetermined period of time has passed since the actuator unit was activated.

Clause 5

The vehicle seat motion system of any other clause or combination of clauses, further comprising a seat back actuator adapted to release the seat back from a locked position.

Clause 6

The vehicle seat motion system of any other clause or combination of clauses, wherein the actuator unit includes an actuator that unlocks the seat back and a longitudinal lock unit.

Clause 7

The vehicle seat motion system of any other clause or combination of clauses, wherein the predetermined arrangement comprises a forward-most position along the vehicle floor.

Clause 8

The vehicle seat motion system of any other clause or combination of clauses, wherein the system further comprises a manual-memory unit configured to recall stored seat arrangements for use at a later time.

Clause 9

The vehicle seat motion system of any other clause or combination of clauses, wherein the manual memory unit recalls the vehicle seat initial arrangement in response to a manual release and the controller is configured to activate the actuator unit to facilitate rearrangement of the vehicle seat back to the vehicle seat initial arrangement and lock the vehicle seat when the sensor unit senses the seat is in the initial arrangement.

Clause 10

The vehicle seat motion system of any other clause or combination of clauses, wherein the system further comprises a force sensor unit coupled to the controller and configured to detect one-handed forces applied to the seat back or seat front and generate signals indicative of the forces, wherein the controller is further configured to receive activation signals from the force sensor unit and activate the actuator unit, wherein activation of the actuator unit facilitates rearrangement of the vehicle seat to a predetermined arrangement to allow for cargo storage in front of or behind the seat.

Clause 11

The vehicle seat motion system of any other clause or combination of clauses, wherein the controller selects a stored seat arrangement in response to a user applied forces consisting of gesture onto the back of the seat back.

Clause 12

The vehicle seat motion system of any other clause or combination of clauses, wherein the controller selects a stored seat arrangement in response to detection of user applied forces consisting of a gesture onto the face of the seat back.

Clause 13

The vehicle seat motion system of any other clause or combination of clauses, wherein the remote interface includes a first set of remote release buttons and interactive display coupled to a steering wheel and a remote release button coupled to the seat back of the vehicle seat.

Clause 14

The vehicle seat motion system of any other clause or combination of clauses, wherein the first set of release buttons and remote release button are programmed to trigger storage, deletion or recall of various arrangements of the seat.

Clause 15

The vehicle seat motion system of any other clause or combination of clauses, wherein, in response to the recall button being triggered, the controller activates actuator unit to facilitate rearrangement of the vehicle seat to a stored initial arrangement.

Clause 16

The vehicle seat motion system of any other clause or combination of clauses, wherein, in response to activation of a manual release latch, the actuator unit is activated to facilitate rearrangement of the vehicle seat to the initial arrangement.

Clause 17

The vehicle seat motion system of any other clause or combination of clauses, wherein the actuator unit includes a guide rod, a slide mechanism, and a spring clamp, and wherein the guide rod is coupled to the slide mechanism in a fixed position, the seat bottom is coupled to the guide rod so as to slide back and forth along the guide rod, and the spring clamp is coupled to the guide rod to move between an engaged locked position and a disengaged slidable position facilitating movement of the vehicle seat and locking of the vehicle seat at any location along the longitudinal path of the vehicle seat.

Clause 18

The vehicle seat motion system of any other clause or combination of clauses, wherein the actuator unit further includes a longitudinal lock actuator coupled to the spring clamp via a Bowden cable to control the movement between the engaged locked position and disengaged slidable position.

Clause 19

The vehicle seat motion system of any other clause or combination of clauses, further comprising a seat height mover including a seat height actuator coupled to a seat height input plate and a seat height support link coupled to the vehicle seat.

Clause 20

The vehicle seat motion system of any other clause or combination of clauses, wherein activation of the seat height actuator unlocks the seat height input plate and the seat height support link to facilitate movement of the vehicle seat to a predetermined position to maximize space for cargo storage front of or behind the seat.

Clause 21

The vehicle seat motion system of any other clause or combination of clauses, wherein the controller reactivates the actuator unit in response to engagement of the remote interface a second time, wherein reactivation of the actuator unit enables the passenger to rearrange the vehicle seat to a second arrangement to secure the cargo.

Clause 22

The vehicle seat motion system of any other clause or combination of clauses, further comprising a force sensor unit, wherein the controller activates the actuator unit, enabling sliding of the seat forward along the floor, when a cargo force is applied to the seat back and deactivates the actuator unit, preventing further sliding, when a sensed cargo force against the seat back is ceased.

Clause 23

The vehicle seat motion system of any other clause or combination of clauses, wherein the controller deactivates the actuator unit, preventing further sliding, when the seat comes into contact with an obstruction.

Clause 24

The vehicle seat motion system of any other clause or combination of clauses, wherein the controller actuates a seat back actuator, facilitating folding of the seat back towards the seat bottom in response to an additional force applied to the seat back after the vehicle seat comes into contact with the obstruction.

Clause 25

The vehicle seat motion system of any other clause or combination of clauses, wherein the powered means for rearranging the vehicle seat includes a slide motor configured to move the seat bottom along the floor; a sensor unit that detects forces applied to front and back sides of the seat back, and a controller coupled to the slide motor and the sensor unit.

Clause 26

The vehicle seat motion system of any other clause or combination of clauses, wherein the controller receives signals indicative of forces applied to front and back sides of the seat back from the sensor unit and is configured to activate the slide motor in response.

Clause 27

The vehicle seat motion system of any other clause or combination of clauses, further comprising a recline motor adapted to pivot the seat back about the seat bottom.

Clause 28

The vehicle seat motion system of any other clause or combination of clauses, further comprising an enablement unit for enabling or disabling movement of the vehicle seat.

Clause 29

The vehicle seat motion system of any other clause or combination of clauses, wherein the enablement unit includes an enablement button to enable movement of the vehicle seat for a predetermined time period.

Clause 30

The vehicle seat motion system of any other clause or combination of clauses, wherein the enablement unit includes a vehicle condition sensor configured to detect if the vehicle is moving and disable movement of the vehicle seat while the vehicle is moving.

Clause 31

The vehicle seat motion system of any other clause or combination of clauses, wherein the enablement unit includes a proximity sensor configured to detect an object in the path of vehicle seat movement and disable movement of the vehicle seat to avoid collision with the detected object.

Clause 32

The vehicle seat motion system of any other clause or combination of clauses, wherein the enablement unit includes a gate sensor configured to detect open/closed arrangement of a door to disable movement of the vehicle seat while the door is closed.

Clause 33

The vehicle seat motion system of any other clause or combination of clauses, wherein the powered means rearranges the seat into a predetermined arrangement when a user applies a gesture consisting of a predetermined pattern of forces onto the back of the seat back.

Clause 34

The vehicle seat motion system of any other clause or combination of clauses, wherein the powered means rearranges the seat into a predetermined arrangement in response to detection of a user applied force consisting of a gesture of a predetermined pattern of forces onto the face of the seat back.

Clause 35

The vehicle seat motion system of any other clause or combination of clauses, wherein the powered means includes a controller, slide motor, and force sensor unit, wherein the controller adjusts the slide motor speed based on the amount of force applied to the seat back.

Clause 36

The vehicle seat motion system of any other clause or combination of clauses, wherein an increase in force applied causes an increase in speed of operation of the powered means.

Clause 37

The vehicle seat motion system of any other clause or combination of clauses, wherein the powered means slides the vehicle seat forward, away from a trunk entry, of the vehicle when the sensor unit senses a cargo force against the seat back.

Clause 38

The vehicle seat motion system of any other clause or combination of clauses, wherein the powered means stops sliding the vehicle seat forward in response to sensing the cargo force against the seat back is ceased.

Clause 39

The vehicle seat motion system of any other clause or combination of clauses, wherein the powered means stops sliding the vehicle seat forward in response to the seat contacting with an obstruction or reaching a full-forward position.

Clause 40

The vehicle seat motion system of any other clause or combination of clauses, wherein the powered means further folds the seat back towards the seat bottom in response to an additional force applied to the seat back after the vehicle seat comes into contact with an obstruction or reaching a full-forward position.

Clause 41

The vehicle seat motion system of any other clause or combination of clauses, wherein the powered means is further configured to rearrange the seat to secure the cargo between the vehicle seat and an additional seat in response to a force applied to an opposite side of the seat back.

Clause 42

The vehicle seat motion system of any other clause or combination of clauses, wherein the powered means detects a predetermined amount of resistance applied by the cargo to the seat to stop rearrangement and secure the cargo.

Clause 43

The vehicle seat motion system of any other clause or combination of clauses, wherein the predetermined amount of resistance is a value at which the cargo is secured but not squeezed by the vehicle seat.

Clause 44

The vehicle seat motion system of any other clause or combination of clauses, further comprising a seat height motor wherein the seat height motor is activated in response to forces applied to the seat front to raise or lower the seat in order to allow for cargo storage above or below vehicle seat.

The invention claimed is:

1. A vehicle seat motion system for loading cargo into a vehicle, the vehicle seat motion system comprising:
   a vehicle seat including a bottom, a seat front and a seat back coupled to the seat bottom to pivot about relative to the seat bottom, the seat bottom being adapted to slide back and forth along a vehicle floor;
   a remote interface unit;
   a sensor unit coupled to the vehicle seat to sense an arrangement of the vehicle seat relative to the vehicle floor;

an actuator unit coupled to the seat bottom to cause the seat bottom to slide selectively relative to the vehicle floor;

a controller configured to receive a signal from the remote interface unit, activate the actuator unit in response to a sensed force applied to the seat back to facilitate sliding the vehicle seat back and forth along the vehicle floor to a predetermined arrangement, and deactivate the actuator unit in response to sensing the vehicle seat at the predetermined arrangement so that storage space in the vehicle is maximized while time and effort expended by a user is minimized; and a force sensor unit coupled to the controller and configured to detect the sensed force applied to the seat back or seat front and generate signals indicative of an amount and pattern of the sensed force, wherein the controller is further configured to receive the signals from the force sensor unit and activate the actuator unit and wherein activation of the actuator unit facilitates rearrangement of the vehicle seat to the predetermined arrangement to allow for cargo storage in front of or behind the seat.

2. The vehicle seat motion system of claim 1, wherein the actuator unit includes a longitudinal lock unit movable between a locked position in which the seat bottom is blocked from sliding relative to the vehicle floor and an unlocked position in which the seat bottom is permitted to slide relative to the vehicle floor and a longitudinal lock actuator configured to move the longitudinal lock unit between the locked position.

3. The vehicle seat motion system of claim 2, wherein the controller deactivates the actuator unit in response to the predetermined arrangement not having been reached after a predetermined period of time has passed since the actuator unit was activated.

4. The vehicle seat motion system of claim 1, further comprising a seat back actuator arranged to release the seat back from a locked position.

5. The vehicle seat motion system of claim 1, wherein the remote interface unit includes a first set of remote release buttons and an interactive display coupled to a steering wheel and a remote release button coupled to the seat back of the vehicle seat.

6. The vehicle seat motion system of claim 5, wherein the first set of remote release buttons and the remote release button are programmed to trigger storage, deletion, or recall of various arrangements of the seat.

7. The vehicle seat motion system of claim 1, wherein the actuator unit comprises a guide rod; a slide mechanism; and a spring clamp, wherein the guide rod is coupled to the slide mechanism in a fixed position, the seat bottom is coupled to the guide rod so as to slide back and forth along the guide rod, and the spring clamp is coupled to the guide rod to move between an engaged locked position and a disengaged slidable position allowing movement of the vehicle seat and locking of the vehicle seat at any location along a longitudinal path of the vehicle seat relative to the vehicle floor.

8. The vehicle seat motion system of claim 7, wherein the actuator unit further includes a longitudinal lock actuator coupled to the spring clamp via a Bowden cable to control movement between the engaged locked position and disengaged slidable position.

9. The vehicle seat motion system of claim 7, further comprising a seat height mover including a seat height actuator coupled to a seat height input plate and a seat height support link coupled to the vehicle seat, wherein activation of the seat height actuator unlocks the seat height input plate and the seat height support link to cause movement of the vehicle seat to a predetermined position to maximize space for cargo storage front of or behind the seat.

* * * * *